(12) United States Patent
Streeb et al.

(10) Patent No.: US 7,616,117 B2
(45) Date of Patent: Nov. 10, 2009

(54) RECONCILIATION MECHANISM USING RFID AND SENSORS

(75) Inventors: Martin Streeb, Loffenau (DE); Stefan Winzinger, Burrweiler (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 827 days.

(21) Appl. No.: 11/184,233

(22) Filed: Jul. 19, 2005

(65) Prior Publication Data

US 2007/0018819 A1    Jan. 25, 2007

(51) Int. Cl.
*H04Q 5/22* (2006.01)
*G08B 1/08* (2006.01)
*G08B 13/14* (2006.01)

(52) U.S. Cl. .............. 340/572.1; 340/539.1; 340/572.7; 340/572.8; 340/10.1; 340/539.13; 340/539.19; 340/572.4; 340/10.5; 340/10.51; 235/375; 235/383; 235/385

(58) Field of Classification Search .............. 340/572.1, 340/572.4, 572.7, 539.1, 539.12, 539.13, 340/825.49; 235/375, 385
See application file for complete search history.

(56) References Cited

U.S. PATENT DOCUMENTS

| | | | |
|---|---|---|---|
| 3,858,212 A | 12/1974 | Tompkins, et al. | |
| 4,949,299 A | 8/1990 | Pickett et al. | |
| 5,300,875 A * | 4/1994 | Tuttle | 320/138 |
| 5,461,666 A | 10/1995 | McMahan et al. | |
| 5,613,228 A | 3/1997 | Tuttle et al. | |
| 5,621,199 A | 4/1997 | Calari et al. | |
| 5,629,981 A | 5/1997 | Nerlikar | |
| 5,689,415 A | 11/1997 | Calotychos et al. | |
| 5,701,127 A | 12/1997 | Sharpe | |
| 5,703,347 A | 12/1997 | Reddersen et al. | |
| 5,785,181 A | 7/1998 | Quartararo, Jr. | |

(Continued)

FOREIGN PATENT DOCUMENTS

DE    10314260 A1    10/2004

(Continued)

OTHER PUBLICATIONS

European Search Report dated Feb. 6, 2006 mailed Feb. 20, 2006 for European Patent Application Serial. No. 10/985,173, 3 Pages.

(Continued)

*Primary Examiner*—Benjamin C Lee
*Assistant Examiner*—Lam P Pham
(74) *Attorney, Agent, or Firm*—Turocy & Watson LLP; William R. Walbrun

(57) ABSTRACT

An RFID ASIC (Application-Specific Integrated Circuit) that can receive and store digital data from at least one of sensors and A/D converter devices. The ASIC can include one or more of the following components as desired for a given application: a passive power/communications coupling component with antenna that couples power into the ASIC when employed as a passive device, and for facilitating communications with the device when powered; a control module that control or facilitates the control of all onboard functions; a memory for storing data (e.g., timestamp and event information) and/or programs; a clock for the generation of clock signals and in support of onboard timing requirement; and, a digital I/O interface that facilitates interfacing to digital inputs such as from sensors and/or A/D converters.

17 Claims, 12 Drawing Sheets

U.S. PATENT DOCUMENTS

| | | | |
|---|---|---|---|
| 5,798,693 A | 8/1998 | Engellenner | |
| 5,822,714 A | 10/1998 | Cato | |
| 5,874,724 A | 2/1999 | Cato | |
| 5,874,896 A | 2/1999 | Lowe et al. | |
| 5,905,249 A | 5/1999 | Reddersen et al. | |
| 5,910,776 A | 6/1999 | Black | |
| 5,949,335 A | 9/1999 | Maynard | |
| 5,963,134 A | 10/1999 | Bowers et al. | |
| 5,964,656 A | 10/1999 | Lawler, Jr. et al. | |
| 5,971,587 A | 10/1999 | Kato et al. | |
| 5,973,600 A | 10/1999 | Mosher, Jr. | |
| 6,049,745 A | 4/2000 | Douglas et al. | |
| 6,091,998 A | 7/2000 | Vasko et al. | |
| 6,115,616 A * | 9/2000 | Halperin et al. | 455/557 |
| 6,116,505 A | 9/2000 | Withrow | |
| 6,121,878 A | 9/2000 | Brady et al. | |
| 6,144,301 A | 11/2000 | Frieden | |
| 6,150,948 A | 11/2000 | Watkins | |
| 6,154,790 A | 11/2000 | Pruett et al. | |
| 6,169,483 B1 | 1/2001 | Ghaffari et al. | |
| 6,170,059 B1 | 1/2001 | Pruett et al. | |
| 6,172,609 B1 | 1/2001 | Lu et al. | |
| 6,205,362 B1 | 3/2001 | Eidson | |
| 6,211,789 B1 | 4/2001 | Oldham et al. | |
| 6,263,440 B1 | 7/2001 | Pruett et al. | |
| 6,264,106 B1 | 7/2001 | Bridgelall | |
| 6,265,976 B1 | 7/2001 | Roesner | |
| 6,272,321 B1 | 8/2001 | Bruhnke et al. | |
| 6,275,681 B1 | 8/2001 | Vega et al. | |
| 6,282,407 B1 | 8/2001 | Vega et al. | |
| 6,285,295 B1 | 9/2001 | Casden | |
| 6,286,762 B1 | 9/2001 | Reynolds et al. | |
| 6,286,763 B1 | 9/2001 | Reynolds et al. | |
| 6,293,467 B1 | 9/2001 | Reddersen et al. | |
| 6,305,548 B1 | 10/2001 | Sato et al. | |
| 6,307,517 B1 | 10/2001 | Lee | |
| 6,317,027 B1 | 11/2001 | Watkins | |
| 6,318,636 B1 | 11/2001 | Reynolds et al. | |
| 6,330,971 B1 | 12/2001 | Mabry et al. | |
| 6,342,839 B1 | 1/2002 | Curkendall et al. | |
| 6,354,493 B1 | 3/2002 | Mon | |
| 6,362,738 B1 | 3/2002 | Vega | |
| 6,366,206 B1 | 4/2002 | Ishikawa et al. | |
| 6,377,176 B1 | 4/2002 | Lee | |
| 6,377,203 B1 | 4/2002 | Doany | |
| 6,377,764 B1 | 4/2002 | Morris-Jones | |
| 6,392,544 B1 | 5/2002 | Collins et al. | |
| 6,400,272 B1 | 6/2002 | Holtzman | |
| 6,401,936 B1 | 6/2002 | Isaacs | |
| 6,409,401 B1 | 6/2002 | Petteroti et al. | |
| 6,415,978 B1 | 7/2002 | McAllister | |
| 6,429,776 B1 | 8/2002 | Alicot et al. | |
| 6,445,297 B1 | 9/2002 | Nicholson | |
| 6,445,969 B1 | 9/2002 | Kenney | |
| 6,448,886 B2 | 9/2002 | Garber et al. | |
| 6,451,154 B1 | 9/2002 | Grabau et al. | |
| 6,476,708 B1 | 11/2002 | Johnson | |
| 6,480,100 B1 | 11/2002 | Frieden et al. | |
| 6,484,886 B1 | 11/2002 | Isaacs | |
| 6,486,780 B1 | 11/2002 | Garber | |
| 6,501,382 B1 | 12/2002 | Rehfus | |
| 6,505,780 B1 | 1/2003 | Yassin et al. | |
| 6,517,000 B1 | 2/2003 | McAllister et al. | |
| 6,523,752 B2 | 2/2003 | Nishitani et al. | |
| 6,529,880 B1 | 3/2003 | McKeen et al. | |
| 6,547,040 B2 | 4/2003 | Goodwin, III | |
| 6,549,064 B2 | 4/2003 | Bandy et al. | |
| 6,554,187 B2 | 4/2003 | Otto | |
| 6,563,425 B2 | 5/2003 | Nicholson et al. | |
| 6,566,997 B1 | 5/2003 | Bradin | |
| 6,585,165 B1 | 7/2003 | Kuroda | |
| 6,593,853 B1 | 7/2003 | Barrett et al. | |
| 6,600,418 B2 | 7/2003 | Sainati et al. | |
| 6,607,123 B1 | 8/2003 | Jollifee et al. | |
| 6,608,551 B1 | 8/2003 | Anderson et al. | |
| 6,608,561 B2 | 8/2003 | Lawler, Jr. et al. | |
| 6,612,495 B2 | 9/2003 | Reddersen et al. | |
| 6,617,962 B1 | 9/2003 | Horwitz et al. | |
| 6,621,417 B2 | 9/2003 | Duncan et al. | |
| 6,622,567 B1 | 9/2003 | Hamel et al. | |
| 6,641,042 B1 | 11/2003 | Pierenkemper et al. | |
| 6,650,227 B1 | 11/2003 | Bradin | |
| 6,664,897 B2 | 12/2003 | Pape et al. | |
| 6,669,089 B2 | 12/2003 | Cybulski et al. | |
| 6,672,512 B2 | 1/2004 | Bridgelall | |
| 6,677,852 B1 | 1/2004 | Landt | |
| 6,687,293 B1 | 2/2004 | Loyer et al. | |
| 6,693,539 B2 | 2/2004 | Bowers et al. | |
| 6,700,931 B1 | 3/2004 | Lee et al. | |
| 6,707,376 B1 | 3/2004 | Patterson et al. | |
| 6,712,276 B1 | 3/2004 | Abali et al. | |
| 6,714,121 B1 | 3/2004 | Moore | |
| 6,724,308 B2 | 4/2004 | Nicholson | |
| 6,726,099 B2 | 4/2004 | Becker et al. | |
| 6,745,008 B1 | 6/2004 | Carrender et al. | |
| 6,747,560 B2 | 6/2004 | Stevens, III | |
| 6,750,769 B1 | 6/2004 | Smith | |
| 6,752,277 B1 | 6/2004 | Sempliner | |
| 6,784,789 B2 | 8/2004 | Eroglu et al. | |
| 6,784,813 B2 | 8/2004 | Shanks et al. | |
| 6,791,603 B2 | 9/2004 | Lazo et al. | |
| 6,793,127 B2 | 9/2004 | Alsafadi et al. | |
| 6,802,659 B2 | 10/2004 | Cremon et al. | |
| 6,808,116 B1 | 10/2004 | Eslambolchi | |
| 6,809,646 B1 | 10/2004 | Lee | |
| 6,812,838 B1 | 11/2004 | Maloney | |
| 6,812,841 B2 * | 11/2004 | Heinrich et al. | 340/572.1 |
| 6,816,817 B1 | 11/2004 | Retlich | |
| 6,828,902 B2 | 12/2004 | Casden | |
| 6,842,106 B2 | 1/2005 | Hughes et al. | |
| 6,847,856 B1 | 1/2005 | Bohannon | |
| 6,853,294 B1 | 2/2005 | Ramamurthy et al. | |
| 6,853,303 B2 | 2/2005 | Chen et al. | |
| 6,859,757 B2 | 2/2005 | Muehl et al. | |
| 6,870,797 B2 | 3/2005 | Reasoner et al. | |
| 6,873,260 B2 | 3/2005 | Lancos et al. | |
| 6,879,809 B1 | 4/2005 | Vega et al. | |
| 6,888,459 B2 | 5/2005 | Stilp | |
| 6,897,763 B2 | 5/2005 | Schulmerich et al. | |
| 6,899,476 B1 | 5/2005 | Barrus et al. | |
| 6,901,304 B2 | 5/2005 | Swan et al. | |
| 6,903,656 B1 | 6/2005 | Lee | |
| 6,917,291 B2 | 7/2005 | Allen | |
| 6,918,541 B2 | 7/2005 | Knowles et al. | |
| 6,929,412 B1 | 8/2005 | Barrus et al. | |
| 6,935,560 B2 * | 8/2005 | Andreasson et al. | 235/385 |
| 6,940,408 B2 | 9/2005 | Ferguson et al. | |
| 6,943,678 B2 | 9/2005 | Muirhead | |
| 6,943,688 B2 | 9/2005 | Chung et al. | |
| 6,967,579 B1 | 11/2005 | Elizondo | |
| 6,975,229 B2 * | 12/2005 | Carrender | 340/572.4 |
| 6,992,574 B2 | 1/2006 | Aupperie | |
| 6,999,955 B1 | 2/2006 | Horvitz | |
| 7,023,342 B2 | 4/2006 | Corbett et al. | |
| 7,036,729 B2 * | 5/2006 | Chung | 235/385 |
| 7,057,509 B2 | 6/2006 | Gualdi et al. | |
| 7,061,379 B2 | 6/2006 | Chen et al. | |
| 7,066,388 B2 | 6/2006 | He | |
| 7,066,687 B2 | 6/2006 | Chapman et al. | |
| 7,069,100 B2 | 6/2006 | Monette et al. | |
| 7,073,712 B2 | 7/2006 | Jusas et al. | |
| 7,075,412 B1 | 7/2006 | Reynolds et al. | |
| 7,079,023 B2 | 7/2006 | Haller | |
| 7,084,769 B2 | 8/2006 | Bauer et al. | |

| Patent/Pub No. | Date | Name |
|---|---|---|
| 7,114,655 B2 | 10/2006 | Chapman et al. |
| 7,127,507 B1 | 10/2006 | Clark et al. |
| 7,135,976 B2 * | 11/2006 | Neff et al. ............... 340/572.1 |
| 7,151,456 B2 | 12/2006 | Godfrey |
| 7,165,722 B2 | 1/2007 | Shafer et al. |
| 7,183,922 B2 | 2/2007 | Mendolia et al. |
| 7,187,288 B2 | 3/2007 | Mendolia et al. |
| 7,194,072 B2 | 3/2007 | Gamble |
| 7,195,159 B2 | 3/2007 | Sloan et al. |
| 7,212,637 B2 | 5/2007 | Salisbury |
| 7,221,258 B2 | 5/2007 | Lane et al. |
| 7,230,730 B2 | 6/2007 | Owen, et al. |
| 7,240,027 B2 | 7/2007 | McConnell et al. |
| 7,272,502 B2 | 9/2007 | Lee et al. |
| 7,336,167 B2 | 2/2008 | Olsen, III et al. |
| 7,336,243 B2 | 2/2008 | Jo et al. |
| 7,373,087 B2 * | 5/2008 | Shi et al. ................. 398/147 |
| 7,388,491 B2 | 6/2008 | Chand et al. |
| 7,389,921 B2 | 6/2008 | Lin et al. |
| 7,486,181 B2 | 2/2009 | Olsen et al. |
| 7,510,110 B2 | 3/2009 | Pietrzyk et al. |
| 2001/0000019 A1 | 3/2001 | Bowers et al. |
| 2001/0008390 A1 | 7/2001 | Berquist |
| 2001/0015760 A1 | 8/2001 | Fellegara et al. |
| 2002/0005774 A1 | 1/2002 | Rudolph |
| 2002/0067265 A1 | 6/2002 | Rudolph |
| 2002/0070862 A1 | 6/2002 | Francis et al. |
| 2002/0130778 A1 | 9/2002 | Nicholson |
| 2002/0143320 A1 | 10/2002 | Levin |
| 2002/0165758 A1 | 11/2002 | Hind et al. |
| 2002/0167397 A1 | 11/2002 | Eroglu et al. |
| 2002/0185532 A1 | 12/2002 | Berquist et al. |
| 2003/0007473 A1 | 1/2003 | Strong et al. |
| 2003/0023337 A1 | 1/2003 | Godfrey et al. |
| 2003/0102367 A1 | 6/2003 | Monette et al. |
| 2003/0109951 A1 | 6/2003 | Hsiung et al. |
| 2003/0150908 A1 | 8/2003 | Pokorny et al. |
| 2003/0169149 A1 | 9/2003 | Ohki et al. |
| 2003/0203730 A1 | 10/2003 | Wan et al. |
| 2003/0216969 A1 | 11/2003 | Bauer et al. |
| 2004/0008123 A1 * | 1/2004 | Carrender et al. ...... 340/825.49 |
| 2004/0024644 A1 | 2/2004 | Gui et al. |
| 2004/0032443 A1 | 2/2004 | Moylan |
| 2004/0061324 A1 | 4/2004 | Howard |
| 2004/0062294 A1 | 4/2004 | Clemens et al. |
| 2004/0066281 A1 | 4/2004 | Hughes et al. |
| 2004/0069851 A1 | 4/2004 | Grunes |
| 2004/0084526 A1 | 5/2004 | Knowles et al. |
| 2004/0095910 A1 | 5/2004 | Metts et al. |
| 2004/0108378 A1 | 6/2004 | Gatz |
| 2004/0124988 A1 | 7/2004 | Leonard et al. |
| 2004/0160324 A1 | 8/2004 | Stilp |
| 2004/0181467 A1 | 9/2004 | Raiyani et al. |
| 2004/0189443 A1 | 9/2004 | Eastburn |
| 2004/0220860 A1 | 11/2004 | Persky et al. |
| 2005/0012613 A1 | 1/2005 | Eckstein et al. |
| 2005/0021369 A1 | 1/2005 | Cohen et al. |
| 2005/0035849 A1 | 2/2005 | Yizhack |
| 2005/0040934 A1 | 2/2005 | Shanton |
| 2005/0052283 A1 | 3/2005 | Collins et al. |
| 2005/0058483 A1 | 3/2005 | Chapman et al. |
| 2005/0083180 A1 | 4/2005 | Horwitz |
| 2005/0088299 A1 | 4/2005 | Bandy et al. |
| 2005/0092825 A1 | 5/2005 | Cox et al. |
| 2005/0093678 A1 | 5/2005 | Forster et al. |
| 2005/0099268 A1 | 5/2005 | Juels et al. |
| 2005/0110641 A1 | 5/2005 | Mendolia et al. |
| 2005/0140511 A1 | 6/2005 | Bonnell et al. |
| 2005/0143026 A1 | 6/2005 | Bellantoni |
| 2005/0143916 A1 | 6/2005 | Kim et al. |
| 2005/0145688 A1 | 7/2005 | Milenkovic et al. |
| 2005/0149414 A1 | 7/2005 | Schrodt et al. |
| 2005/0154572 A1 | 7/2005 | Sweeney |
| 2005/0155213 A1 | 7/2005 | Eastin |
| 2005/0159913 A1 | 7/2005 | Ariyoshi et al. |
| 2005/0162256 A1 | 7/2005 | Kinoshita |
| 2005/0170784 A1 | 8/2005 | Ariyoshi et al. |
| 2005/0177423 A1 | 8/2005 | Swanson |
| 2005/0179521 A1 | 8/2005 | Pillai et al. |
| 2005/0180566 A1 | 8/2005 | Ryal |
| 2005/0188095 A1 | 8/2005 | Gardiner et al. |
| 2005/0190098 A1 | 9/2005 | Bridgelall et al. |
| 2005/0192727 A1 | 9/2005 | Shostak et al. |
| 2005/0197775 A1 | 9/2005 | Smith |
| 2005/0200457 A1 | 9/2005 | Bridgelall et al. |
| 2005/0206552 A1 | 9/2005 | Friedrich |
| 2005/0206555 A1 | 9/2005 | Bridgelall et al. |
| 2005/0212660 A1 | 9/2005 | Hansen et al. |
| 2005/0212673 A1 | 9/2005 | Forster |
| 2005/0212676 A1 | 9/2005 | Steinberg |
| 2005/0219039 A1 | 10/2005 | Allen |
| 2005/0228528 A1 | 10/2005 | Farchmin et al. |
| 2005/0237162 A1 | 10/2005 | Hyde et al. |
| 2005/0240305 A1 | 10/2005 | Bogash et al. |
| 2005/0253717 A1 | 11/2005 | Howarth et al. |
| 2005/0253718 A1 | 11/2005 | Droms et al. |
| 2005/0258955 A1 | 11/2005 | Gloekler et al. |
| 2005/0269407 A1 | 12/2005 | Harmon |
| 2006/0006231 A1 | 1/2006 | Anson et al. |
| 2006/0027658 A1 | 2/2006 | Genc et al. |
| 2006/0038077 A1 | 2/2006 | Olin et al. |
| 2006/0049250 A1 | 3/2006 | Sullivan |
| 2006/0053234 A1 | 3/2006 | Kumar et al. |
| 2006/0060657 A1 | 3/2006 | Choong et al. |
| 2006/0071774 A1 | 4/2006 | Brown et al. |
| 2006/0125653 A1 | 6/2006 | McQuade |
| 2006/0145850 A1 | 7/2006 | Krstulich |
| 2006/0170565 A1 | 8/2006 | Husak et al. |
| 2006/0200256 A1 | 9/2006 | Mason et al. |
| 2006/0208859 A1 | 9/2006 | Hougen et al. |
| 2006/0232382 A1 | 10/2006 | Bauer et al. |
| 2006/0279412 A1 | 12/2006 | Holland et al. |
| 2007/0008073 A1 | 1/2007 | Poasevara |
| 2007/0013517 A1 | 1/2007 | Posamentier |
| 2007/0013519 A1 | 1/2007 | Chung et al. |
| 2007/0035396 A1 | 2/2007 | Chand et al. |
| 2007/0040681 A1 | 2/2007 | Jessup |
| 2007/0063029 A1 | 3/2007 | Brandt et al. |
| 2007/0137531 A1 | 6/2007 | Muirhead |
| 2007/0159311 A1 | 7/2007 | Schober |
| 2007/0205860 A1 | 9/2007 | Jones et al. |
| 2007/0205861 A1 | 9/2007 | Nair et al. |

FOREIGN PATENT DOCUMENTS

| | | |
|---|---|---|
| EP | 1542105 A | 6/2005 |
| WO | 0016289 | 3/2000 |
| WO | WO 0016289 | 3/2000 |
| WO | 0058752 | 10/2000 |
| WO | WO 0058752 | 10/2000 |
| WO | 0169516 | 9/2001 |
| WO | 02073523 | 9/2002 |
| WO | 03056403 A | 7/2003 |
| WO | 03056469 A | 7/2003 |
| WO | 2005045743 A | 5/2005 |
| WO | 2007/030544 A3 | 3/2007 |

OTHER PUBLICATIONS

M. Karkkainen, et al.: "The product centric approach: a solution to supply network information management problems?" Computers in Industry, Elsevier Science Publishers. Amsterdam, NL, vol. 52, No. 2, Oct. 2003.

European Search Report dated Feb. 14, 2006 mailed Feb. 20, 2006 for European Patent Application Serial No. 10/985,621, 3 Pages.

Partial International Search Report dated Mar. 30, 2006, for PCT Application Serial No. PCT/EP2005/007878, 3 pages.

International Search Report dated May 17, 2006 for International Patent Application Serial No. PCT/EP2005/007878, 8 pages.
OA Dated Aug. 8, 2008 for U.S. Appl. No. 11/241,421, 49 pages.
OA Dated Aug. 28, 2008 for U.S. Appl. No. 11/129,199, 28 pages.
OA Dated May 30, 2008 for U.S. Appl. No. 11/222,256, 60 pages.
OA Dated Apr. 28, 2008 for U.S. Appl. No. 11/220,130, 29 pages.
OA Dated Apr. 30, 2008 for U.S. Appl. No. 11/185,114, 80 pages.
International Search Report for PCT Application Serial No. PCT/US06/34290, mailed Feb. 5, 2008, 2 pages.
International Search Report for PCT Application No. PCT/US06/34290, mailed Feb. 5, 2008, 2 pages.
International Search Report for PCT Application Serial No. PCT/US06/34290, mailed Feb. 5, 2008, 2 pages.
OA Dated Jan. 30, 2009 for U.S. Appl. No. 11/129,199, 32 pages.
OA Dated Nov. 28, 2008 for U.S. Appl. No. 11/239,959, 75 pages.
OA Dated Jan. 12, 2009 for U.S. Appl. No. 11/184,233, 359 pages.
OA Dated Mar. 19, 2009 for U.S. Appl. No. 11/220,130, 18 pages.
OA Dated Nov. 24, 2008 for U.S. Appl. No. 11/220,130, 36 pages.
OA Dated Sep. 18, 2008 for U.S. Appl. No. 11/190,143, 22 pages.
OA Dated Mar. 26, 2009 for U.S. Appl. No. 11/200,915, 70 pages.
OA Dated Sep. 30, 2008 for U.S. Appl. No. 11/230,758, 63 pages.
OA Dated Feb. 6, 2009 for U.S. Appl. No. 11/241,421, 14 pages.
OA Dated Oct. 2, 2008 for U.S. Appl. No. 11/185,114, 42 pages.
International Search Report for PCT Application Serial No. PCT/US06/34721 mailed Apr. 26, 2007, 1 page.
OA Dated Apr. 16, 2009 for U.S. Appl. No. 11/230,758, 26 pages.
OA Dated Apr. 21, 2009 for U.S. Appl. No. 11/190,143, 19 pages.

* cited by examiner

# RECONCILIATION MECHANISM USING RFID AND SENSORS

CROSS-REFERENCE TO RELATED APPLICATIONS

This application is related to U.S. patent application Ser. No. 11/222,256 entitled "RFID ARCHITECTURE IN AN INDUSTRIAL CONTROLLER ENVIRONMENT" filed on 8 Sep. 2005, U.S. patent application Ser. No. 11/220,130 entitled "SENSOR FUSION AND INTELLIGENT RFID TAG TO ENHANCE RFID READ ACCURACY" filed on 6 Sep. 2005, and U.S. patent application Ser. No. 11/185,114 entitled "SMART PALLET AND MULTI-FREQUENCY RFID TAGS" filed on 20 Jul. 2005. The entireties of the above-noted applications are incorporated by reference herein.

TECHNICAL FIELD

This invention is related to RFID (Radio Frequency Identification) technology, and more specifically, to an ASIC that employs RFID technology.

BACKGROUND OF THE INVENTION

An evolving technology that is rapidly gaining interest is Radio Frequency Identification (RFID), which leverages electronic data to mitigate data from reading (e.g., scanning bar codes) and/or opening containers to obtain product information. Suitable electronic product data can include electronic product code (EPC) data, as well as other product-related data. A typical EPC is a unique number bit-encoded and embedded in an RFID tag (a small silicon chip with one or more antennas) affixed to an associated product. An RFID reader is a device that can be utilized to read and/or write RFID tag data, depending on read/write privileges. Data stored in the RFID tag can include product data such a product type, a unique product code, source information, and destination information, for example. Thus, data read from the RFID tag can be utilized to provide a greater degree of certainty over what goes into a supply chain and how to manage raw materials, warehouse inventory, shipments, logistics, and/or various other aspects of manufacturing.

In clinical trials, for example, medication and other related items are packaged and distributed to clinical research facilities. Subjects (e.g., patients or healthy people) are treated there in order to test newly-developed drugs, for example. If the subject drops out of the trial or the trial ends, the remaining medication(s) and related medical items need to be accounted for. For example, visit boxes are assembled with the required mediations and related items (e.g., needles) for each patient. When the trial is over, the remaining medications and related items in the visit box need to be returned and accurately accounted for. This can mean that reconciliation down to the pill level ("pill counting") is required. Additionally, the used visit boxes may contain used needles and broken vials, for example. Consequently, the opening and handling of such a used visit box involves a high security and health risk for the staff. Thus, there is an unmet need in the art for an improved technique that facilitates the automatic reconciliation of packaging and contents.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises an RFID ASIC (Application-Specific Integrated Circuit) that can receive and store digital data from at least one of sensors and A/D converter devices. The ASIC can include the following components: a passive power/communications coupling component with antenna that couples power into the ASIC when employed as a passive device, and for facilitating communications with the device when powered; a control module that control or facilitates the control of all onboard functions; a memory for storing data (e.g., timestamp and event information) and/or programs; a clock for the generation of clock signals and in support of onboard timing requirement; and, a digital I/O interface that facilitates interfacing to digital inputs such as from sensors and/or A/D converters.

Energy for the tag to provide such aforementioned capabilities can be obtained directly by induction in the RFID antenna or a separate coil, and by an attached energy source (e.g., coin cell, gold cap capacitor, . . . ). When an active device is desired, an onboard power source can be provided. This can be an alternative to the passive power source provided with the power/communications coupling component, or in combination therewith. The control module allows for the specification and use of one or more protocols to exchange the data. Additionally, external programming is possible to activate and/or deactivate specific functionality, if not required for the identified application.

In another aspect of the subject invention, location signals (e.g., Global Positioning System) can be employed to track the product. Such location information can further be stored on the ASIC device. For example, if a GPS unit is used in combination with temperature and/or time, then it is possible to get full control over the location and storage conditions of a specific part during the whole life cycle.

In yet another aspect thereof, an artificial intelligence component is provided that employs a probabilistic and/or statistical-based analysis to prognose or infer an action that a user desires to be automatically performed.

In yet another embodiment, a reconciliation system is provided that compares information stored in the tag before the associated product (or package) is shipped with new information stored therein with the product is returned. This finds particular application in medical trials where medical containers are prepared and provided with drugs and other related medical objects (e.g., needles) for distribution to a medical research facility. When the trials are over, or at virtually anytime, the medical product is returned to the distributor where usage data is examined. The tag is scanned to determine the usage data thereby alleviating the need for medical personnel to expose themselves to high risk objects and materials.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will

DETAILED DESCRIPTION OF THE INVENTION

Figure 1:
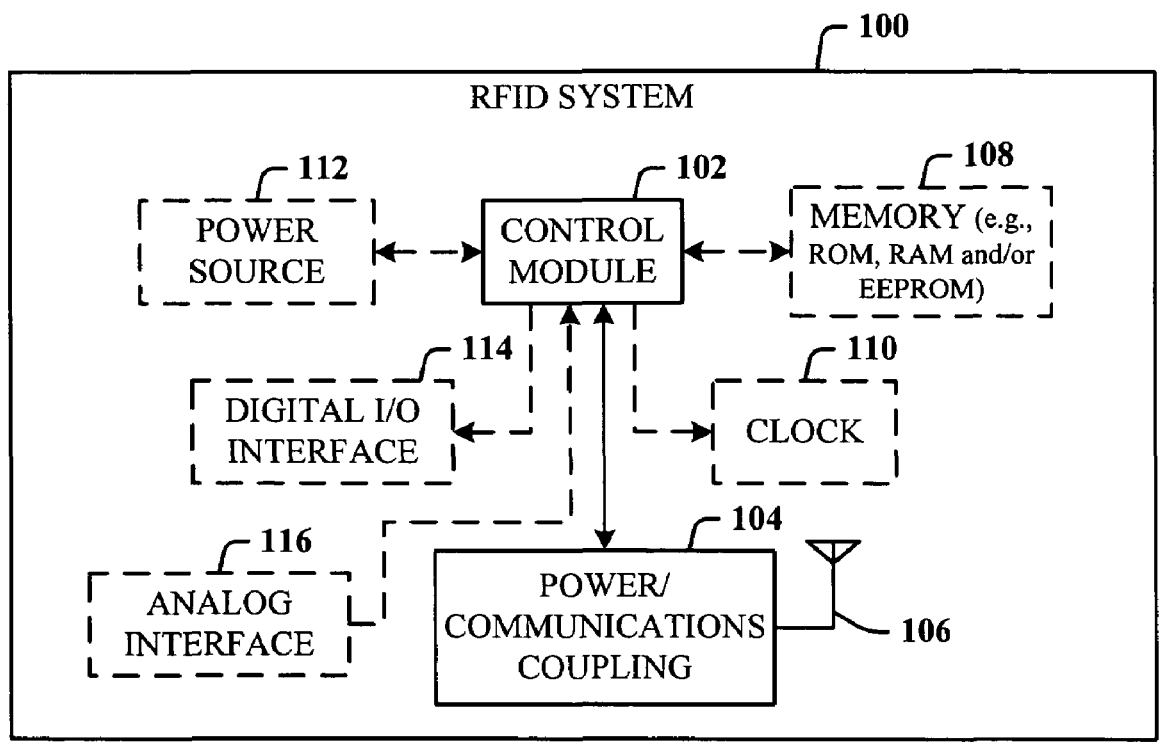
FIG. 1 illustrates a schematic block diagram of a Radio Frequency Identification (RFID) system in accordance with the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a schematic block diagram of a Radio Frequency Identification (RFID) system 100 in accordance with the invention. The system 100 can be fabricated as an ASIC (Application-Specific Integrated Circuit) such that one or more functions that are typically employed as separate systems can be fabricated together as a single operating unit. Here, the RFID system 100 is an enhanced RFID chip of an RFID tag.

The system 100 includes a central control module 102 that controls and/or facilitates the control of all onboard functions and other components. The control module 102 performs, for example, protocol handling such that a single protocol or a number of different protocols can be employed for the exchange (e.g., read, write, and read/write) of data stored on the system 100.

The system 100 includes a power coupling and communications component 104 that includes an antenna 106 (or other type of coupling element) for coupling power to the system 100. The antenna 106 can be fabricated used coil-on-chip technology for data transfer and power generation (in a passive mode). Coupling can be inductively and/or by propagation. Once the system is powered, the component 104 also facilitates communications of both data and signals between the system 100 and a remote system (not shown). In support of communications, the component 104 further includes the circuits for channel encoding. The component 104 also processes the carrier wave that carries the data in the air interface between the system 100 and the remote system. Thus, the component 104 processes modulation schemes that facilitate amplitude shift keying, frequency shift keying and phase shift keying, for example. The component 104 can also accommodate different frequency bands such as 100-500 KHz, 10-15 MHz, and 850-950 MHz and 2.4-5.8 GHz bands, for example. It is within contemplation of the subject invention that the system 100 can be designed to accommodate other bands as they are developed for use in RFID applications.

Additionally, the carrier frequencies that can be supported include the following: less than 135 KHz for applications such as animal tagging and access control; 1.95 MHz, 3.25 MHz, 4.75 MHz, and 8.2 MHz for EAS (Electronic Article Surveillance) systems; about 13 MHz and 13.56 MHz for EAS systems and ISM (Industrial, Scientific, and Medical); about 27 MHz, 430-460 MHz, 902-916 MHz for ISM; 918-926 MHz for RFID for transmitters with an EIRP (Equivalent Isotropically Radiated Power) of less than one watt; 2.35-2.45 GHz for ISM in many parts of the world; and 5.4-6.8 GHz for future allocations.

The system 100 also includes a memory 108 that facilitates the storage of data. For example, the memory 108 can comprise a volatile memory (e.g., RAM) of the temporary data storage during interrogation and response. The memory 108 can also include non-volatile read-only memory such as ROM and/or programmable non-volatile memory such as EEPROM. The EEPROM-type memory can be used to store system data and is non-volatile to ensure data is stored when the system 100 is in an unpowered mode, for example. The memory 108 can also include data buffers that hold incoming and outgoing data temporarily related to modulation and interface to the system antenna 106. A clock 110 is provided for onboard timing of one or more of the components.

The system 100 heretofore has been described as a passive system such that power is coupled into the system 100 from a remote source such as an RFID reader. It is to be appreciated that the system 100 can be an active system such that an onboard power source 112 (e.g., a battery cell and/or capacitor) can store power to support read/write operations, for example, during the lifetime of the system 100. The onboard power source 112 can be provided without the passive source that is included in the component 104 or in combination therewith, whatever the given application may require.

In this particular implementation, the system 100 also includes a digital input/output (I/O) interface 114 such that digital signals and/or information can be conveyed between the system 100 and an external source. For example, one or more sensors can interface to the system 100 to store digital sensor data in the memory 108 as the system 100 is moved with the associated article of commerce throughout logistics processes (e.g., packing, transportation between source and destination, and back, use in assembly processes, reconciliation processes, and so on). Additionally, the digital interface 114 can accommodate other digital signals such as that received from digital converters (A/D converters) or virtually any digital device insofar as the storage requirements are consider on the system 100. In an alternative implementation, any or all of the memory 108, the clock 110, and the digital I/O interface 114 are optional (as indicated by the dashed lines). For example, if it is only desired to measure the traveling time of the product from distributor to destination, it would be sufficient to employ the memory have 108 and clock 110, but not the digital interface 114. Timestamp data is written via the antenna 106 and the power/communications coupling block 104 directly into the memory 108 at the starting location and at the ending location, where the timestamp data can then be read.

In yet another implementation, a sensor on a blister card (see FIG. 9), for example, will only gather and send its sensor information (e.g., tablet exists or tablet is taken) via the digital I/O interface 114 when the sensor is connected via the power/communications coupling block 104 and antenna 106, and not store it in memory 108. Therefore, in this scenario, the memory 108 and the clock 110 are not necessary.

One or more sensors, as desired for a given application, can be integrated directly into the ASIC. For example, a temperature dependent resistor can be provided that is connected via an A/D converter to the control module 102. Additionally, the RFID system can employ an optional analog interface 116 for connecting on or more analog sensors that do not employ onboard digital logic.

In a more robust implementation, the subject invention can be realized not only as an ASIC, but an IP (Intellectual Property) core. An IP core is a block of logic or data that can be used in making a programmable logic device (PLD) (e.g., a Field Programmable Gate Array—FPGA or Complex Programmable Logic Device—CPLD). The control module 102 can be a programmable logic device. Thus, a VHDL (VHSIC—Very High Speed Integrated Circuits Hardware Description Language) model of the software can be developed that is capable of running on the control module 102. VHDL is a hardware description language for describing digital electronic systems. Thus, the control module 102 can be a device of the ASIC that offers the user the chance to implement his or her own logic in hardware.

Additionally, an RFID/PLD combination accommodates programming such devices wirelessly (without connecting cables to the printed circuit board). This capability saves material (e.g., no socket, no wire) and makes it possible to program devices that are encapsulated in material (e.g., synthetics, behind/within concrete walls) to provide a higher level of protection against gases, or fluids, or protect them against vandalism. The antenna 106 could be manufactured as a single layer with the same technology that will be used for the rest of the printed circuit board. This is a substantial improvement over conventional architectures that support programming via a JTAG (Joint Test Action Group) interface.

Figure 2:
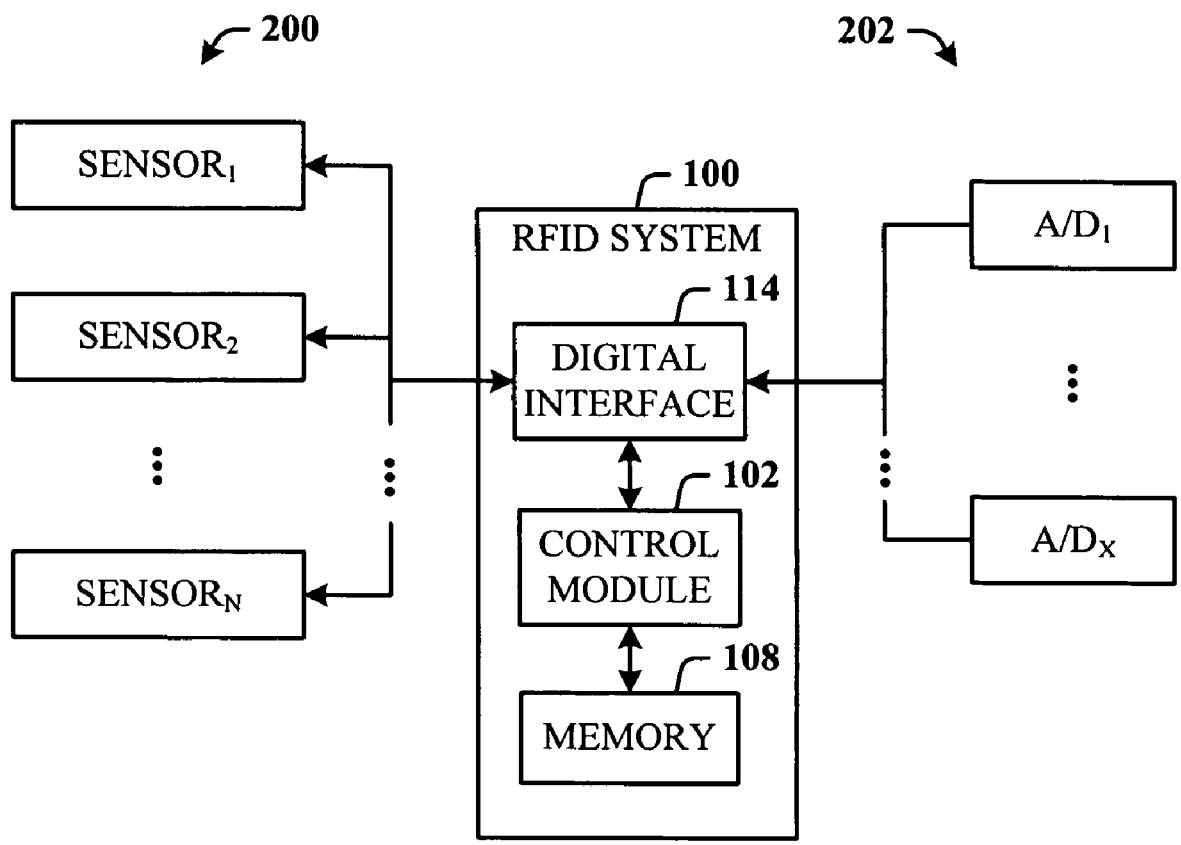
FIG. 2 illustrates that the system of FIG. 1 can interface to digital subsystems for digital data processing and storage in accordance with the invention.

FIG. 2 illustrates that the system 100 of FIG. 1 can interface to digital subsystems for digital data processing and storage in accordance with the invention. Here, the digital interface 114 can receive data from one or more sensors 200 (denoted $SENSOR_1$, $SENSOR_2$, ..., $SENSOR_N$) and/or one or more A/D converters 202 (denoted $A/D_1$, ..., $A/D_X$). For example, sensor data from a temperature sensor can be written into the memory 108 via the control module 102. This sensor input operation can be performed periodically according to predetermined timing criteria and/or trigger information. In a passive system example, each time the system 100 passes within range of a reader that energizes the system 100, a sensor (or converter) read operation can be initiated automatically. In another example, once sufficient sensor data has been stored, the control module 102 invokes a command that prevents further sensor read operations from occurring based upon a trigger or set/reset bit from the memory which indicates that no more data can be stored therein.

In another example, the control module 102 will read sensor data only from select one of the sensors 200 and/or converters 202, thereby utilizing a protocol handler that can accommodate only the sensor and/or converter for which communications therewith is accommodated by the protocol. It is to be appreciated that many different types of triggers and commands can be provided for a given application that impact operation of the system 100 in different ways. In the context of medical testing, for example, the sensors 200 and/or converters 202 can be those associated with the insertion and removal of medical products in relation to the visit box. It is to be appreciated, however, that although the description focuses on application to clinical trials and medical products, the subject invention finds application in many different areas of packing, shipping, and products such as for food stuffs, for example.

By using RFID in cooperation with the UPUC (Unique Package Unit Code), all levels of detail from the shipping box down to each tablet or capsule can be managed. By enhancing the RFID chip in accordance with the subject invention binary inputs and/or results from A/D converters can be read.

In the context of medical trials, if energy is by induction or coil, the evaluation of sensor results can only take place during the time energy is inducted by the sender. This can be sufficient for basic instances of sensing such as the container was opened and the pill was removed. If it is preferred that data be monitored over the lifetime of the product, the attached energy source option should be employed. Such data can include temperature curves or sensor events in combination with the time the data was obtained. This can also be useful for logistic processes, for example, the transportation of pharmaceutical or food products that must be handled within a specific temperature range.

In operation, if a number of visit boxes arrive, then a scanning unit recognizes the boxes and contents automatically. Additionally, the sensor data can be retrieved. The system knows from the existing packaging instructions and medication information which parts can be expected for a specific box visit. By checking the sensors, it is possible to find out if something was used or removed. This form of reconciliation can be performed on every package layer from the package down to each capsule, and this without any risk to staff members, and within a very short period of time.

Figure 3:
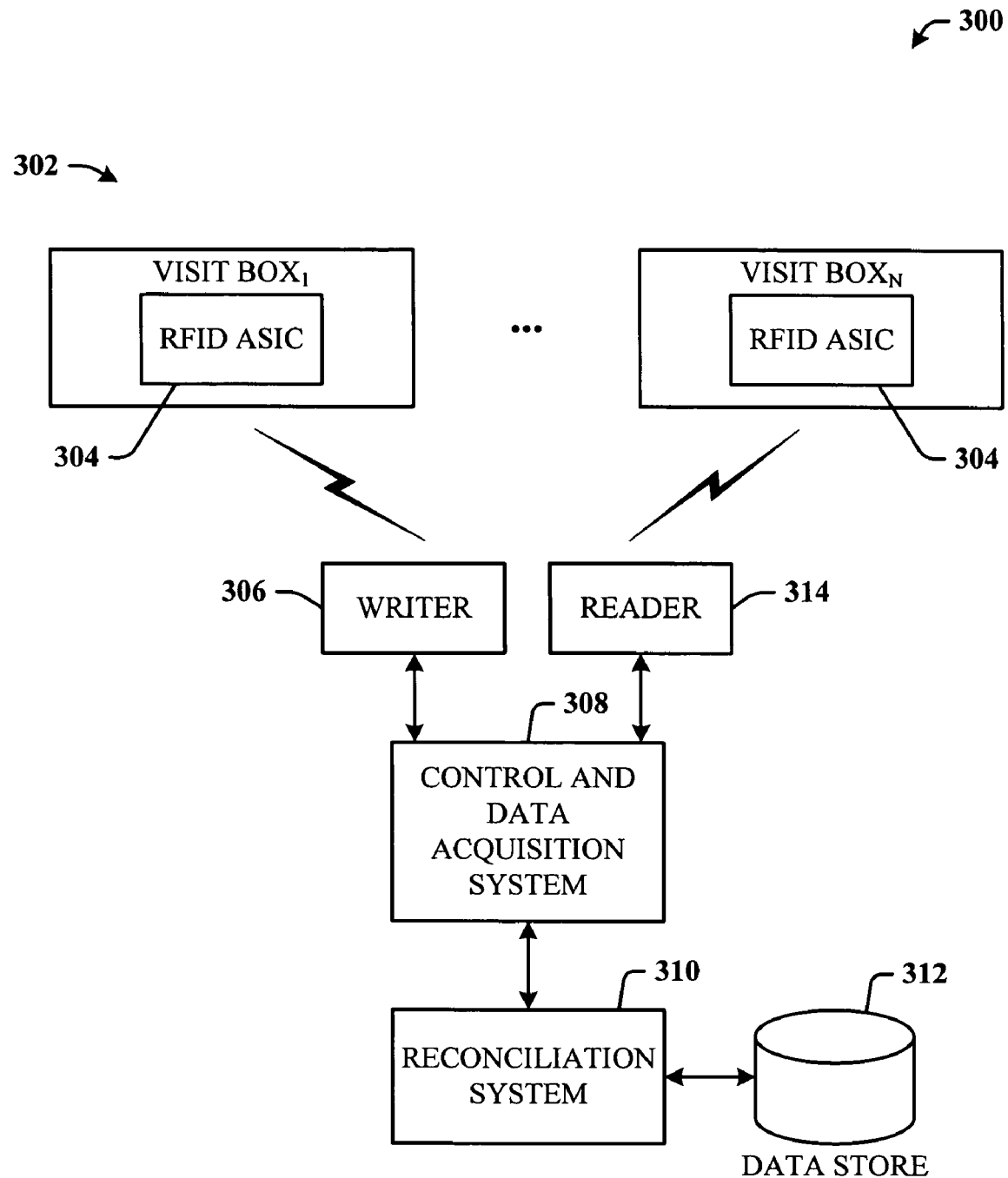
FIG. 3 illustrates a system that facilitates medical visit box processing and reconciliation in accordance with the subject invention.

Referring now to FIG. 3, there is illustrated a system 300 that facilitates medical visit box processing and reconciliation in accordance with the subject invention. The system 300 can be employed both by the distributor for preparing visit boxes 302 (denoted $VISIT\ BOX_1, \ldots, VISIT\ BOX_N$) for distribution to a medical research facility and also at the medical research facility when receiving the visit boxes 302 for patient testing. In preparation therefore, each of the visit boxes 302 includes at least one corresponding RFID tag 304 ($RFID_1, \ldots, RFID_N$) constructed in accordance to the system 100 of FIG. 1. The system 300 can further include a writer 306 that writes data to the tags 304, a control and data acquisition system 308 that interfaces to the writer 306 to provide data thereto, a reconciliation system 310 that interfaces to the system 308, and an associated data store 312 that can store at least all data related to the visit boxes 302 including the tag data, research facility data, distributor data, research facility data, and so on.

As the visit boxes 302 are processed by the distributor, the writer 306 receives packaging instructions and medication information from the data store 312 via the reconciliation system 310, and writes contents information related to the visit box contents into each corresponding tag 304. The contents information can include information such as pill count, pill type, drug type, drug code (e.g., National Drug Code—NDC), liquid/gel quantity, vial count, vial size, vial contents, destination facility, date shipped, needle count, needle contents, box weight, test number, and test subject name and/or identification, for example. The amount and type of information is limited only by the onboard storage capacity of the tags 304. The contents information can be provided to the writer 306 via the control and data acquisition system 308, which retrieves the related information from the data store 312 via the reconciliation system 310. Alternatively, the system 308 can have its own data store (not shown) form which to access the desired data.

Before the visit boxes 302 leave the distribution facility, the distributor can employ a reader 314 to scan the contents of the box and verify that the scanned data matches the contents information written into each of the corresponding tags 304, and further, perform a comparison against the data associated with and stored in the data stores 312 for that box. It is to be appreciated that the writer 306 and reader 314 can be constructed as a single unit that provides both the read/write functions.

As the visit boxes 302 are received and in-processed at the medical research facility, the same or similar system 300 can be employed. Thus, the reader 314 scans each of the tags 304 thereby reading the contents information of each visit box 302. The contents information is processed by the control and data acquisition system 308, and reconciled by the reconciliation system 310 according to the contents information transmitted to the medical research facility by the distributor. All information can then be stored on the data store 312.

After the research project has finished, the remaining contents of each of the visit boxes 302 is written back into the corresponding tags 304. When being received back at the distributor, the tags 304 can be read by the reader 314 and reconciled not only against the reconciliation information of the research facility, but the reconciliation data of at the distributor. This form of reconciliation can be performed for each of the boxes 302 from the packaging layer down to each pill without any risk exposed to staff members, and within a very short period of time.

As indicated supra, the tags 304 can also received digital data from one or more sensors such as temperature, humidity, location data, and so on. Thus, by receiving this data, a chain of custody can be established so that the contents are less likely to be mishandled or even stolen, for example.

Figure 4:
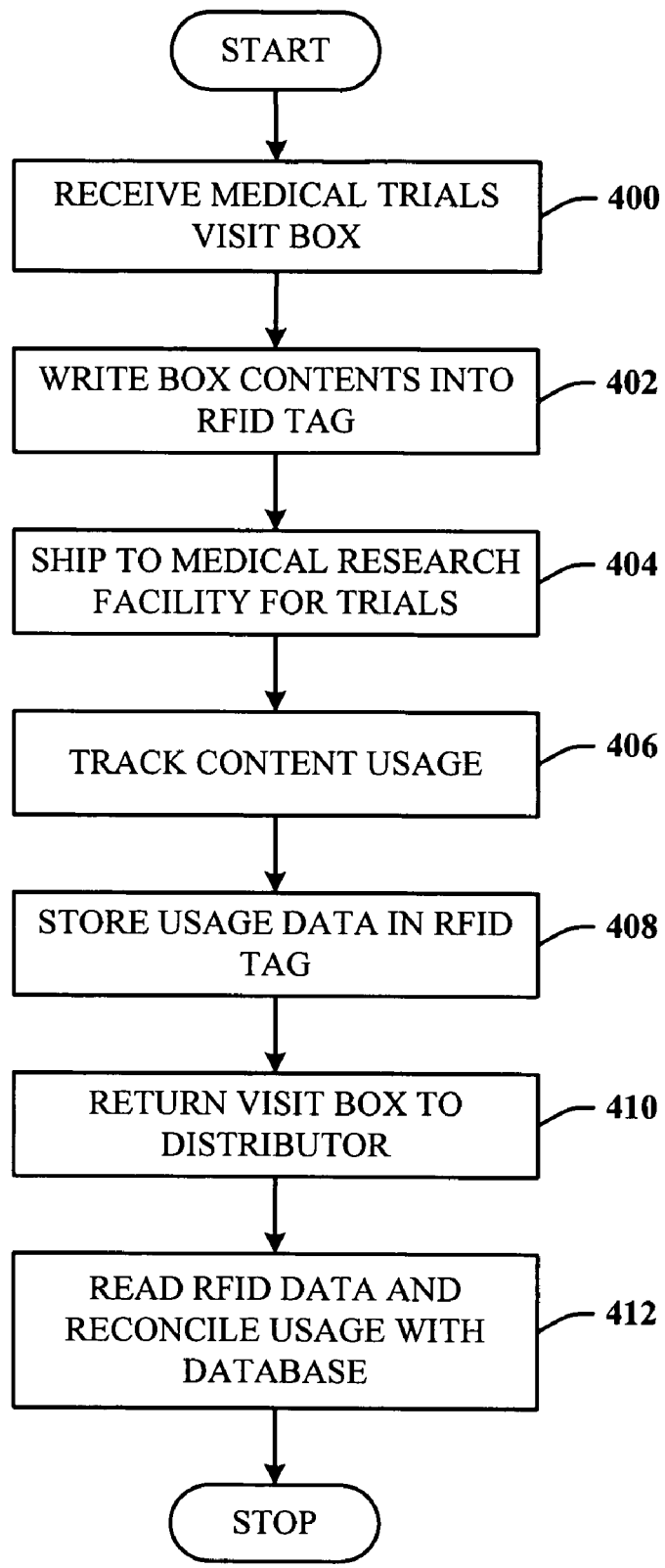
FIG. 4 illustrates a methodology of processing visit boxes in accordance with the invention.

FIG. 4 illustrates a methodology of processing visit boxes in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 400, visit boxes are received for medical trials. At 402, box contents are encoded into the RFID tag. At 404, the research facility receives the boxes. At 406, contents of the boxes are tracked. At 408, contents usage data is written into the RFID tag. At 410, the box is returned to the distributor. At 412, the RFID data is read therefrom and used by a reconciliation system to reconcile the contents with the contents shipped by the distributor.

Figure 5:
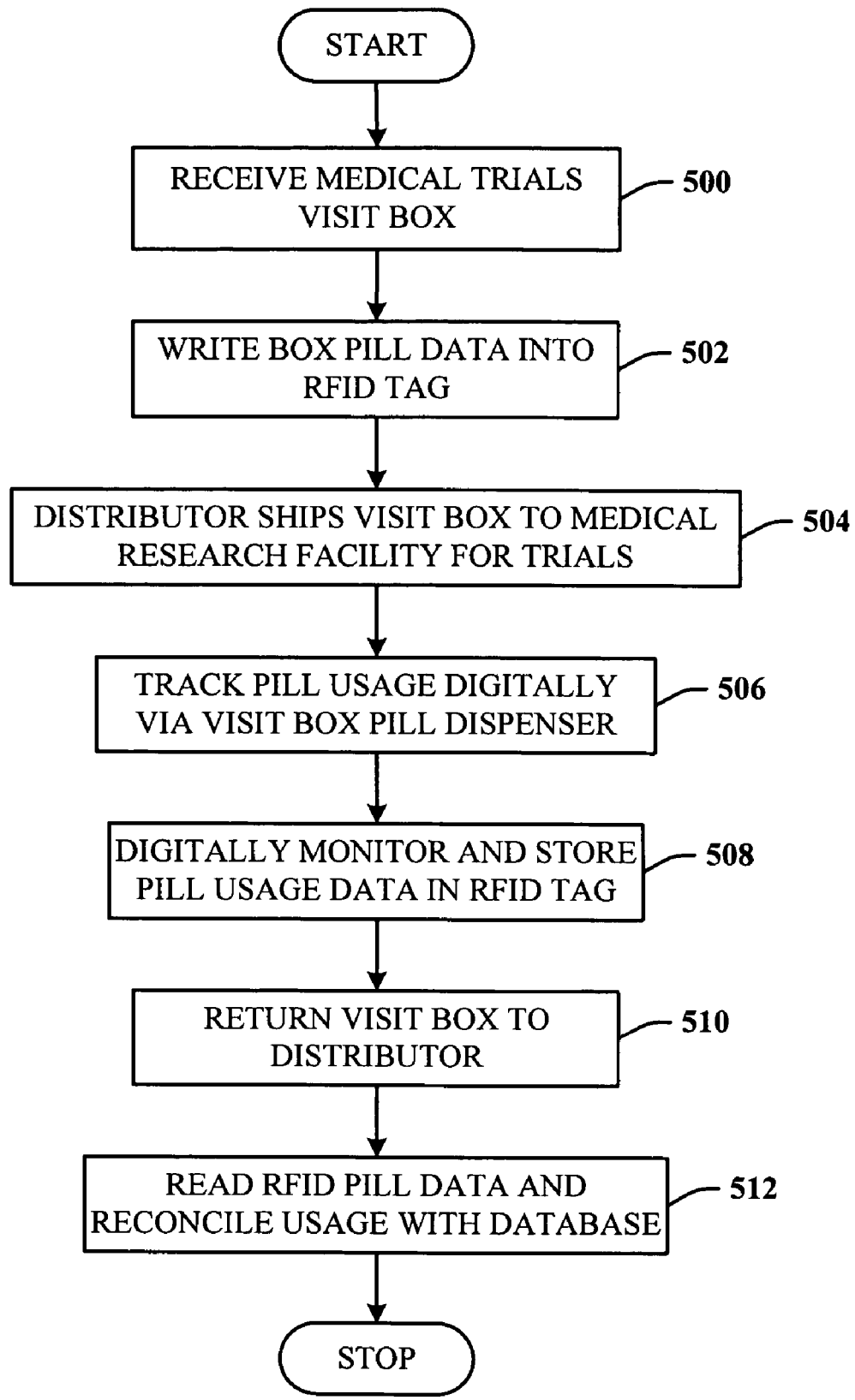
FIG. 5 illustrates a methodology of tracking pill usage in accordance with the invention.

FIG. 5 illustrates a methodology of tracking pill usage in accordance with the invention. At 500, the visit boxes are prepared at the distributor. The pill data is uploaded (or written) into the associate RFID tag of the box, as indicated at 502. At 504, the box is shipped to the research facility. At 506, pill usage is tracked digitally by a pill dispenser. The digital information from the pill dispenser is then written back into the RFID tag, as indicated at 508. This can be by the RFID tag receiving digital output directly from an A/D converter of the pill dispenser and/or a sensor that senses a pill being dispensed. At 510, the visit box is retuned to the distributor. At 512, the pill data is read from the RFID tag and reconciled with the distributor database.

Figure 6:
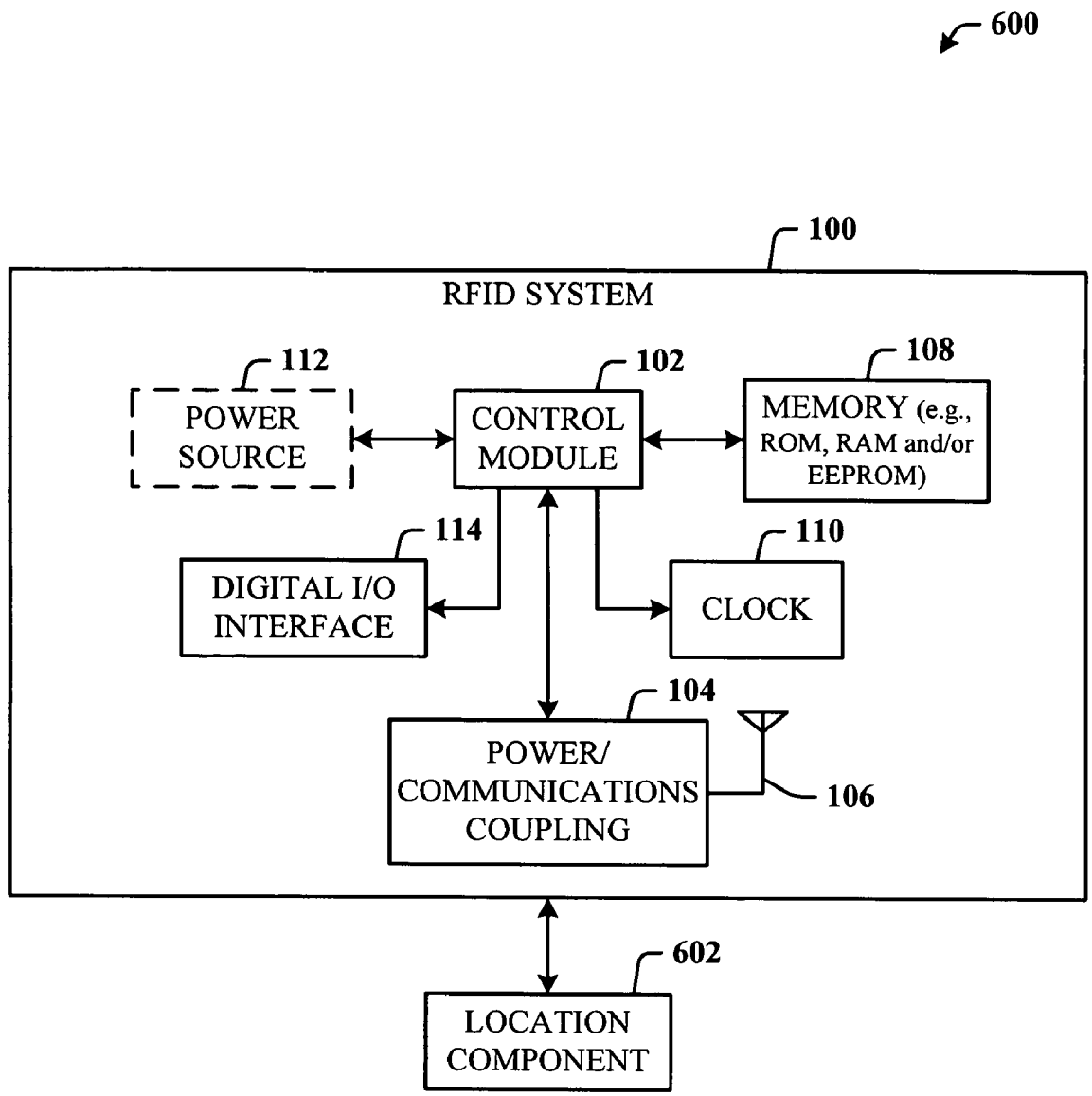
FIG. 6 illustrates an RFID system that employs location information in accordance with the invention.

Referring now to FIG. 6, there is illustrated an RFID system 600 that employs location information in accordance with the invention. Here, location information such as that received from a location component 602 is written to the RFID system 100. The location component can be a GPS (Global Positioning System) technology such that latitude/longitude coordinates are input to the system 100 and/or inside location systems such as WhereNet™ that can track the location of objects inside buildings and other similar structures that block GPS signals. The location information can be obtained and input each time the system 100 is powered. This provides additional tracking information as to where the tag and associated product was at selected times during preparation, shipment, and receipt and return to the distributor.

Figure 7:
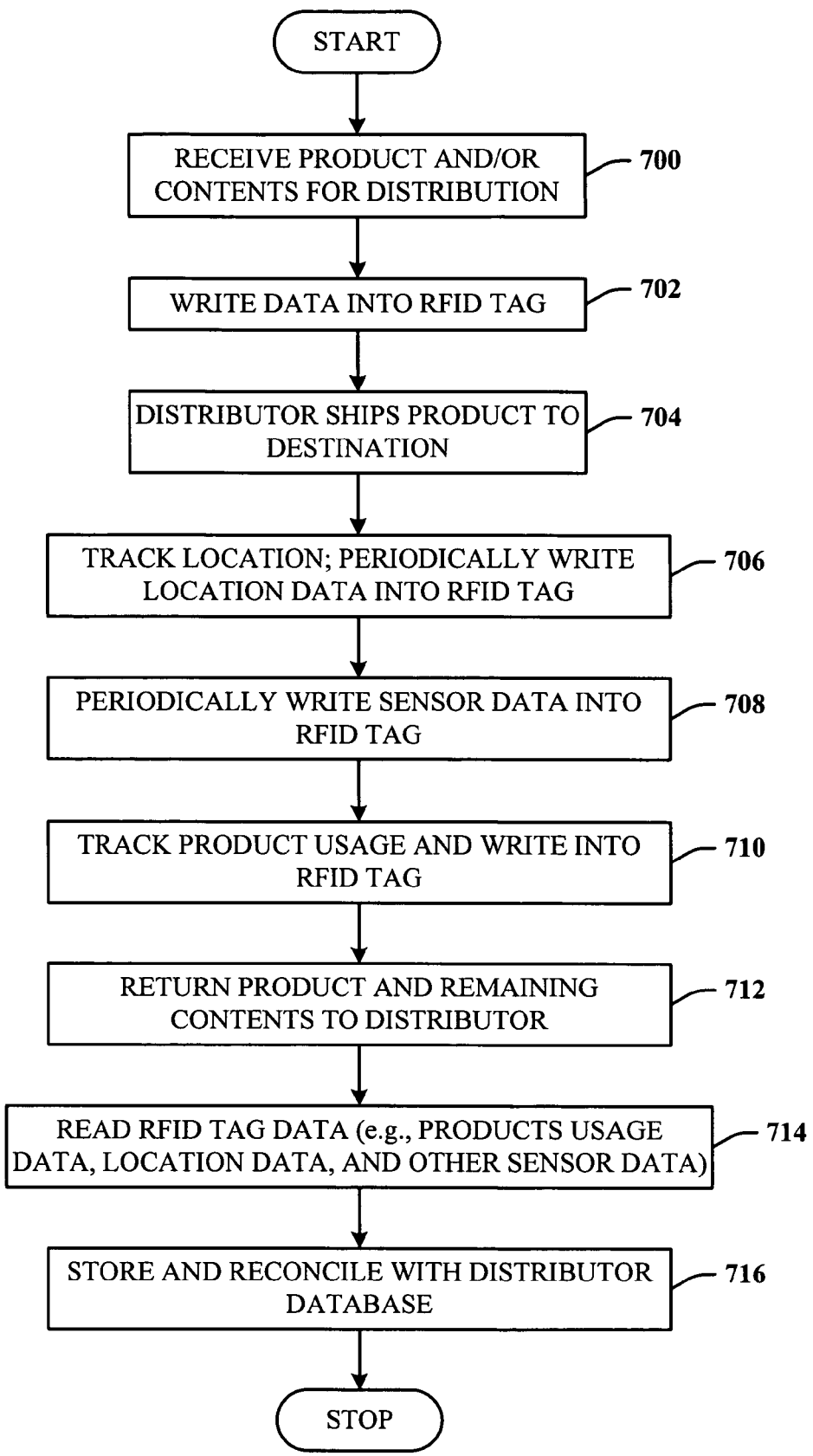
FIG. 7 illustrates a methodology of tracking a product location and contents in accordance with the invention.

FIG. 7 illustrates a methodology of tracking a product location and contents in accordance with the invention. At 700, a product (and its contents) is available for processing by a distributor. At 702, data is written into the associated RFID tag. At 704, the distributor ships the product to a destination. At 706, the location of the product is tracked, and the location data is periodically written into the tag and stored. At 708, sensor data (and/or A/D output data) is periodically written into the tag memory. At 710, product and/or contents usage data is written into the tag. At 712, the product and/or remaining contents are returned to the distributor. At 714, the tag is read for product usage data, location data, sensor data, and other data as desired. At 716, the data is stored a database and reconciled with the distributor database.

Figure 8:
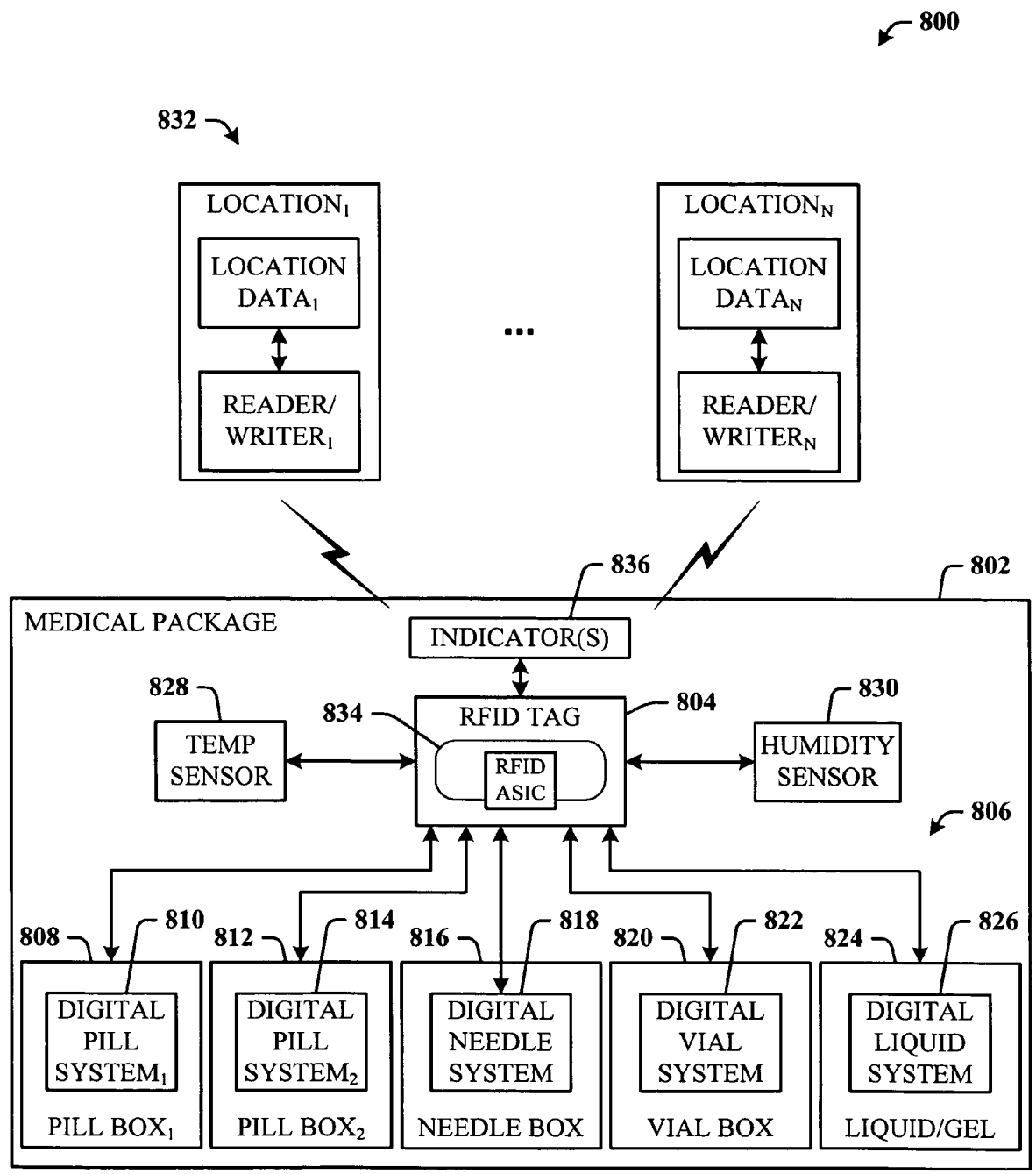
FIG. 8 illustrates a system that facilitates the recording of information related to a medical package and location information in accordance with the invention.

FIG. 8 illustrates a system 800 that facilitates the recording of information related to a medical package 802 and location information in accordance with the invention. The medical package 802 includes an attached RFID tag 804 (similar to the RFID system 100 of FIG. 1) that monitors and records the desired data. For example, in this implementation, the package 802 includes one or more compartments, boxes, and/or reservoirs 806 (denoted PILL BOX$_1$, PILL BOX$_2$, NEEDLE BOX, VIAL BOX, and LIQUID/GEL BOX) that can contain pills, needles, vials, and a liquid/gel dispensable material.

A first pill box 808 has an associated pill sensing system 810 (denoted DIGITAL PILL SYSTEM$_1$,) that senses each pill removed therefrom or returned thereto. Similarly, a second pill box 812 has an associated pill sensing system 814 (denoted DIGITAL PILL SYSTEM$_2$) that senses each pill removed therefrom or returned thereto. A needle box 816 has an associated needle sensing system 818 (denoted DIGITAL NEEDLE SYSTEM) that senses each needle removed therefrom or returned thereto. A vial box 820 has an associated vial sensing system 822 (denoted DIGITAL VIAL SYSTEM) that senses each vial removed therefrom or returned thereto. A liquid/gel box 824 has an associated liquid/gel sensing system 826 (denoted DIGITAL LIQUID/GEL SYSTEM) that senses the quantity of liquid dispensed therefrom.

Each of the digital sensing systems (810, 814, 818, 822 and 826) interfaces to the tag 804 via the digital I/O interface such that corresponding digital signals received from the digital sensing systems (810, 814, 818, 822 and 826) that are passed into the tag system 804 represent the number and quantity of medical products available and used. In other words, raw digital sensor data received from a digital sensing system can be processed by the tag system 804 to determine the number or quantity of medical product used or available at any given time. Alternatively, a digital sensing system includes its own processing capability such that the data passed to the tag system 804 can be stored directly into memory (e.g., a DMA—Direct Memory Access process).

Still alternatively, a digital sensing system can provide direct A/D output to the tag system 804 for processing thereby to determine the corresponding count and/or quantity of the related item. The package 802 can also include a temperature sensor 828 the output of which is passed directly to the tag system 804 for processing and storage. Similarly, other environmental data such as humidity data can be provided by a humidity sensor 830 the output of which is communicated directly to the tag system 804 for processing and storage.

As the medical package 802 is transported through many different locations 832 (denoted LOCATION$_1$, . . . , LOCATION$_N$), location data (e.g., GPS coordinates, indoor location data, business address, building floor data, . . . ) from each corresponding location (denoted LOCATION DATA$_1$, . . . , LOCATION DATA$_N$) can be written to the tag system 804 using respective reader/writer systems (denoted READER/WRITER$_1$, . . . , READER/WRITER$_N$) for storage. Additionally, it may be desired to monitor the quality and/or usability of certain medical products in the package 802 at selected locations. Accordingly, again at selected locations, the reader/writer can read selected information of the tag system 804. For example, medicines in the form of pills can last longer than liquid medicines, which may require refrigeration. Thus, if liquid medicine is provided in the package 802 for the research trials, it may need to be closely monitored during transport to provide some measure of confidence that it will be usable at the research facility when it arrives.

If temperature is important, appropriate commands can be sent to the tag system 804 such that only temperature data is accessed. This can include temperature data recorded during transport and/or realtime data requested at any location. Where a passive tag system is employed, the power and signals are coupled to the tag system 804 via an antenna 834. Where the tag is an active transponder tag, power is provided onboard the tag 804 and signals can be coupled to the tag 804 via the antenna 834.

The medical package 802 can also include one or more indicators 836 that provide a quick visual indication of the risk involved in handling the package 802, for example. In one implementation, a bank of low-power LEDs can be provided such that when the package 802 arrives back at the distributor, power can be either coupled into the tag 804 such that instructions are executed to enable one or more of the LEDs to light indicating to a person handling or about to handle the package 802 that some degree of care should be provided based on the medical risk associated with the package contents.

For example, if the package 802 contains needles that have been infected with a contagious or deadly disease, a single red LED can be powered on (or blinking). Alternatively, if the contents are simply pills that expose little or no risk to the handler, a green LED can be lit, indicating that little care is required in handling the package 802. Where the tag 804 is an active system, it is desired that the LED(s) are not powered when not required. Thus, during transportation (or bulk handling) when the risk to humans is relatively low due to machine handling, the LED(s) can be controlled to be in an off state. This can be accomplished by sending one or more commands to the tag 804 when the package 802 is safely contained (e.g., paletted and machine handled) without direct human interaction, and/or is exiting the research facility, for example, for shipment back to the distributor. If at anytime the package is to be handled by humans, one or more instructions can be communicated to the tag 804 to turn on the appropriate LED(s).

It is to be appreciated that where the tag 804 is an active system, a "gas gauge" sensing system can be employed to determine the remaining lifetime of the onboard power source (e.g., a battery cell). Thus, when the battery lifetime reaches a predetermined value or for other reasons such as power failure or chemical failure of the source, the tag 804 can be programmed to signal the nearest system that the power source needs attention.

The indicators 836 can also include a chemical or litmus-type coloration change on the indicator(s) 836 such that when the package 802 contains high risk medical products that require special handling, the tag system 804 generates a signal the facilitates a coloration change or a chemical change (e.g., red) in the indicator(s) 836 that is readily apparent to the handler. This can require that the indicator(s) be replaced after each use (e.g., a use-only-once indicator strip). It is to be appreciated that an audio indicator can also be employed that emits a predetermined audio beep or voice file indicating the risk contained and handling procedures. Again, this can be enabled at selected locations, at selected times, and according to any number of predetermined criteria.

Figure 9:
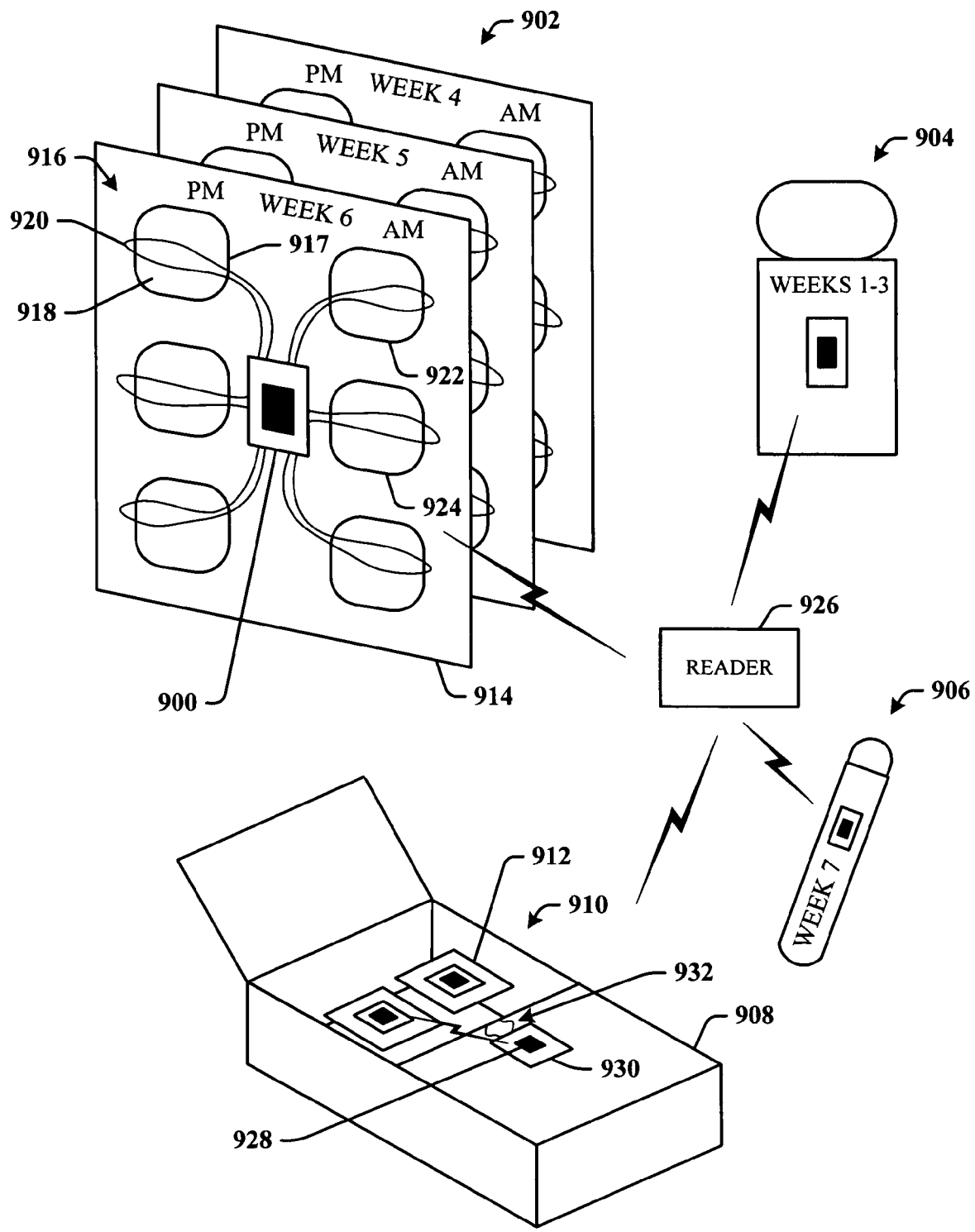
FIG. 9 illustrates an RFID tag application for an alternative visit box implementation in accordance with the invention.

FIG. 9 illustrates an RFID tag application for an alternative visit box implementation in accordance with the invention. The packaging structure of visit boxes can look different for each clinical trial. In this embodiment, an RFID tag 900 (and associated ASIC, indicated as a black box with all RFID tags of this drawing) can be applied to each of a plurality of blister cards 902, a bottle of pills 904, a vial 906 and/or the visit box 908, itself. Here, the visit box 908 is depicted as containing two packages 910 each of which includes an RFID/ASIC tag 912. The visit box 908 is provided with seven weeks of provisions to be used during the clinical trial. Testing during the first three weeks utilizes product from the bottle of pills 904, the next three weeks (Week 4, Week 5, and Week 6) use product from the blister cards 902, and the final week uses product from the vial 906.

A blister card 914 shows six slots 916 for holding and dispensing six corresponding products (e.g., pills). In order to determine that a user has accessed product in a slot 917, each slot cover 918 has attached thereto a small current conducting filament 920 that connects to the RFID/ASIC tag 900. In this particular implementation, the RFID/ASIC tag 900 is an active tag such that onboard power is provided. In this case, a small current (e.g., microamps or nanoamps) can be passed through the filament 920 continuously or periodically to test whether the filament has been broken, thus, indicating that the product stored therein has been accessed. Alternatively, the filament 920 can be an optical fiber that conducts light therethrough which is detected on the return loop. Again, a broken filament will affect the quantity of light received at the detector circuitry.

Still alternatively, it may be that the user simply presses the slot cover 918 into the slot with sufficient force to break the slot cover to where the product can be accessed, without actually breaking the filament 920. In this case, it is likely that the filament 920 would have been stretched sufficiently to changes its initial resistance to a higher resistance, further changing the amount of current that can be passed through the filament. This can also be an indication that the product has been accessed. For example, it can be determined according to predetermined criteria that if the filament resistance change more than 30%, it will be concluded that the user has accessed the product stored in the associated slot.

The application of the RFID/ASIC tag 900 also facilitates sensing and storing the order in which medical products were accessed and the time of access. In other words, it can be detected and recorded that the user accessed the PM slot 917 before an AM slot 922, and that the AM slot 922 was accessed before a second AM slot 924. Such capability further applies between blister cards and in relation to the bottle of pills 904, vial 906 and box 908. Where each pill in the bottle of pills 904 is encased by and RFID tag, this allow the recording of event information on pill level and when was which capsule taken.

A reader 926 can be utilized to continuously or periodically perform a read operation on the visit box contents, blister pack contents, bottle of pills 904 and vial 906. If the reader 926 is also a writer, data can be written back to any or all of the associate RFID tags, which will then be read when arriving back at the distributor. The data read can also be transmitted back to the distributor across a network (e.g., a secure connection) or to any desired location.

The subject invention can also apply a master/slave concept whereby a master ASIC 928 of a visit box tag 930 is applied to the visit box 908 that can perform complex calculations and/or value gathering for humidity or other environmental conditions that apply for the whole box 908. In this case, the ASICs applied to the blister cards 902, bottle of pills 904 and vial 906, etc., are configured as slave devices, and gather consumption data or other events such as breaking seals, that concerns only these specific packages and or products. In one application, the master ASIC 928 will then query the slave ASICs assigned to it during packaging to collect the desired information. In another application, the slave ASICs are active and configured to "know" their corresponding master ASIC, allowing them to send data to the master periodically or upon occurrence of a trigger or event.

Here, the box tag 930 includes filaments 932 that are applied across an opening (e.g., a seam or opening crack) of the box 908 such that when the filaments 932 are broken, it is known that the contents can be accessed. This event can be detected as a triggering event that further causes other applications stored in the ASIC 928 to execute, for example.

It is to be appreciated that the subject invention is not restricted to use in clinical trials, but can be used in many other supply chains. For example, consider the transportation of slaughtered animals (e.g., hogs) from the slaughterhouse to the plant, which produces sausage. Heretofore, it is only possible to measure the temperature of the received goods, and in some cases, there are temperature monitoring devices in the freight vehicle. When subject ASIC is applied to a meat product (e.g., the hog), the whole supply chain can be monitored and reported at the destination, and/or at points during shipment.

In another supply chain example, it would now be possible to seal isolated boxes that contain frozen fish and apply an ASIC to the box. The ASIC can be configured to measure the temperature within the box, and monitor that the seal is not broken until the box arrives at the destination. A complete tracking of the cold chain would now be possible.

Figure 10:
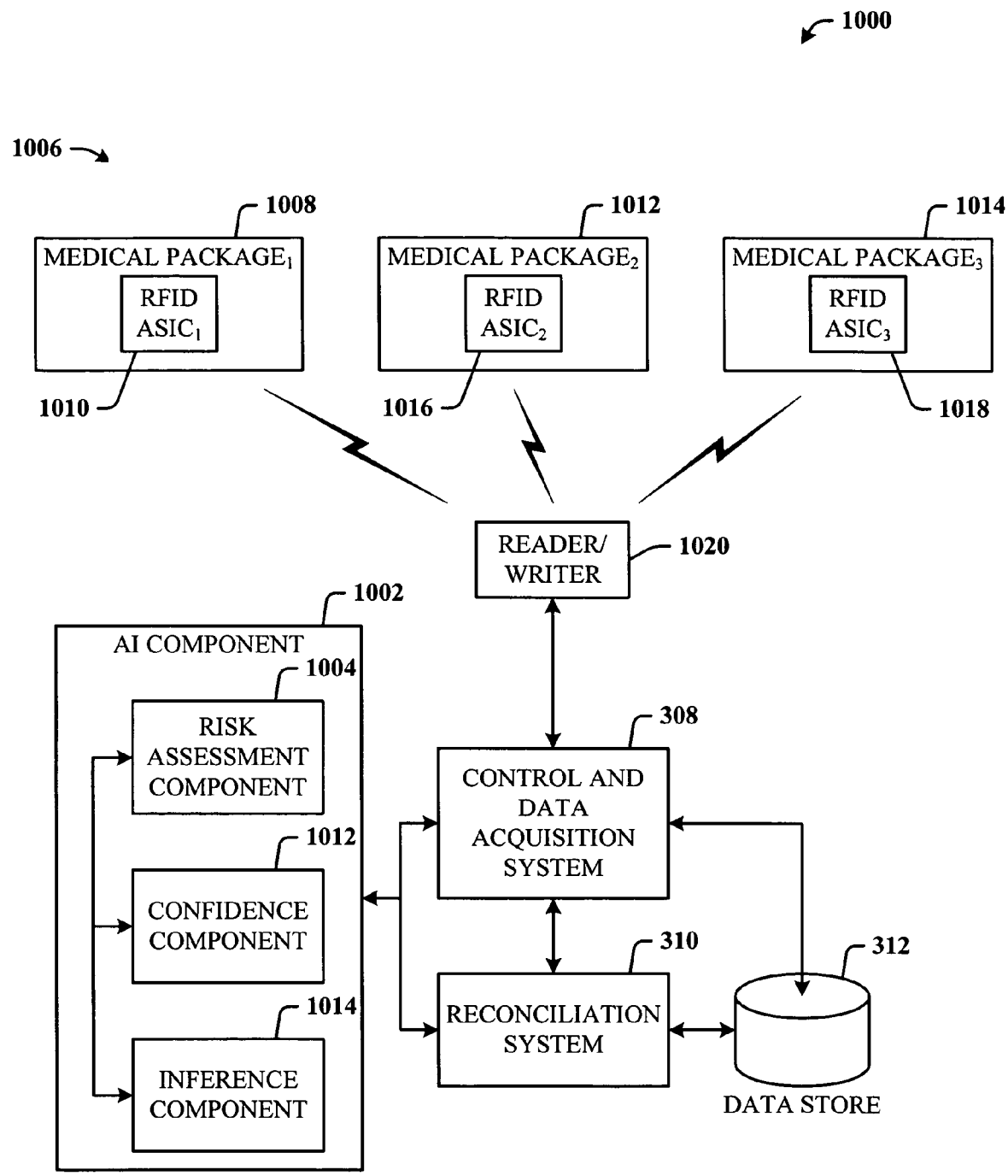
FIG. 10 illustrates a system that employs an artificial intelligence component which facilitates automating one or more features in accordance with the subject invention.

FIG. 10 illustrates a system 1000 that employs an artificial intelligence (AI) component 1002 which facilitates automating one or more features in accordance with the subject invention. The subject invention (e.g., in connection with selection) can employ various AI-based schemes for carrying out various aspects thereof. For example, a process for determining how often a medical package should record data can be facilitated via an automatic classifier system and process. Moreover, where the medical package is transported through several interim locations, the classifier can be employed to determine at which location he package should be activated for recording data.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

Accordingly, the AI component 1002 can also employ a risk assessment component 1004 that computes a degree-of-risk value for each of the medical packages 1006 (or articles of commerce) which can be used to determine how one of the packages 1006 should be handled, for example. If a first medical package 1008 that is returned includes contents that pose a high degree of risk to a human handler, the system at the distributor can read the data stored in the corresponding tag 1010 and determine not only the contents that were originally provided, but also the state in which the contents are after use. This also applies for handling at the research facility when shipping the used packages 1006 back to the distributor, and all handling that must be done while in-transit.

The AI component 1002 can also employ a confidence component 1012 that computes based on some probabilistic/statistical-based analysis that the risk level assigned to a medical package is the correct level, for example. An inference component 1014 of the AI component 1002 infers some action that can be taken based on past actions and/or historical data. This inference can also be based on values computed by the risk assessment component 1004 and confidence component 1012. For example, if it is determined that a given medical package includes perishable drugs, it can be inferred that where a first transportation route will not get the drugs to the destination in time for use, a second route can be selected automatically. This would be based on past rerouting data associated with such a perishable drug, for example.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria how to route articles of commerce, how such articles should be handled, the level of risk assigned, and the number and types of alarms that can be assigned to a given package.

By way of example, consider that a medical trials testing facility places and order to a medical distributor for medical products (e.g., drugs, needles, vials, . . . ) needed for the trials. The order is uploaded to the reconciliation system 310 and stored in the data store 312 in association with the research facility. The distributor processes the order and assembles at least the first medical package 1008, a second medical package 1012, and a third medical package 1014, each containing the desired products. Of course, many more packages 1006 can be assembled, as needed. These can be assembled with identical contents or different contents. In any case, at least contents data that describes the contents of each package is written into the corresponding RFID tags (1010, 1016, and 1018) (the tags including the capabilities described at least in accordance with FIG. 1 and FIG. 6).

When the reconciliation system 310 processes the order, it can flag certain drugs, or other products as requiring special handling and transportation needs. For example, as described supra, one drug may be more perishable than another, requiring that cooling may be required (or that it be maintained above a certain temperature), and/or than it be shipped within certain time limit for optimum use. Another example can include the shipment of antidotes, bacteria, viruses, human organs, etc., all of which could require different logistics needs. In any case, the logistics data for each package can also be uploaded to the corresponding tags (1010, 1016, and 1018) via the control and data acquisition system 308 to a reader/writer 1020. In another implementation, the reconciliation system 310 can include one or more capabilities of the control and data acquisition system 308 such that the reader/writer 1020 operates directly therefrom to communicate to and from the tags (1010, 1016, and 1018).

The logistics data can include instructions written to the tag that describe how onboard program(s) will operate during at least one of out-processing of the package at the distributor, transport processing at any of several locations through which the package will travel, in-processing when arriving at the research facility, out-processing from the facility after the trial is over, transport handling at locations on the way back to the distributor, and in-processing at the distributor. For example, the logistics data for the first package 1010 can include instructions that represent "no special handling is required", "longest or cheapest delivery route is acceptable", and "no environmental measurements required during transport". Logistics data for the second package 1012 can include different requirements such as "special handling is required", "quickest delivery route is required", and "environmental measurements required during transport". In any or all cases, this information can be made available during in-processing, out-processing, and during transport, when and wherever the package is energized and/or instructed to output the logistics data.

In the case of the second package 1012, it may be requested that environmental measurements should be made at only the second and fourth the stops of a five-stop route. However, after the measurements are made at the second stop, it is determined that one measurement places the product outside the required parameters. Based on this existing environmental data, the AI component 1002 can compute a confidence value via the confidence component 1012 which now indicates that viability of the product should shipment continue according to the original instructions. If the confidence value is low, the AI component 1002 can compute alternative measures that need to be taken. For example, the package can be intercepted at its current location and placed on hold.

If the confidence value is within acceptable limits but a trend shows that it may be degrading, the AI component 1002 can compute and update instructions that are written to the tag 1010 to the effect environmental measurements need to be made more frequently. Thus, at the third stop, upon arrival, the tag 1010 will be read and one or more measurements invoked to again ascertain the state of the product and whether the product will make the trip in a usable state. Where the tag is self-powered, the measurements are automatically invoked when a signal has been received to the tag 1010 that triggers one or more instructions that enable the measurements to be made. If the measurements again confirm that the product is degrading, shipment instructions can be automatically changed to expedite shipment of the product.

If it is known that such products are routinely developing these degradation qualities on this particular route, the inference component 1014 can determine from past data that a particular action was taken, and infer that in this case that the same action should be taken in this case.

Such data can be made readily available to ship/receiving personnel via a handheld unit, for example, that reads the logistics data, and for tracking the package during shipment. Alternatively, once the packages 1006 come into range of a reader (fixed or otherwise), its logistics data can be read and processed accordingly by a central system that then alerts personnel as to how the package should be handled.

It is to be appreciated that the forward logistics data of the packages 1006 for shipment from the distributor to the research facility (or destination, in general) can be different than instructions for the return trip from the research facility to the distributor. For example, logistics data related to only needles on the forward trip is might not be time sensitive or handling sensitive, yet the return trip could again, not be time sensitive, but require high-risk handling due to needle contact with contagious diseases. Similarly, a drug that requires careful monitoring of environmental conditions and handling on the forward path might not require such care and handling on the return path.

Alarms and other alert/notifications can also be employed based on the instruction and changes to the instructions written to the tag of the product, and changes in the risk levels associated with any given medical package and/or product contained therein. For example, a changing requirement during transport can call for different alerts to be generated at the destination or virtually any location of the package. An alert related to a medical product when first shipped can be changed for the same package when being shipped back to the distributor. Instructions for managing such alerts and notifications can be written to the tag at anytime and/or activated from an external system.

Figure 11:
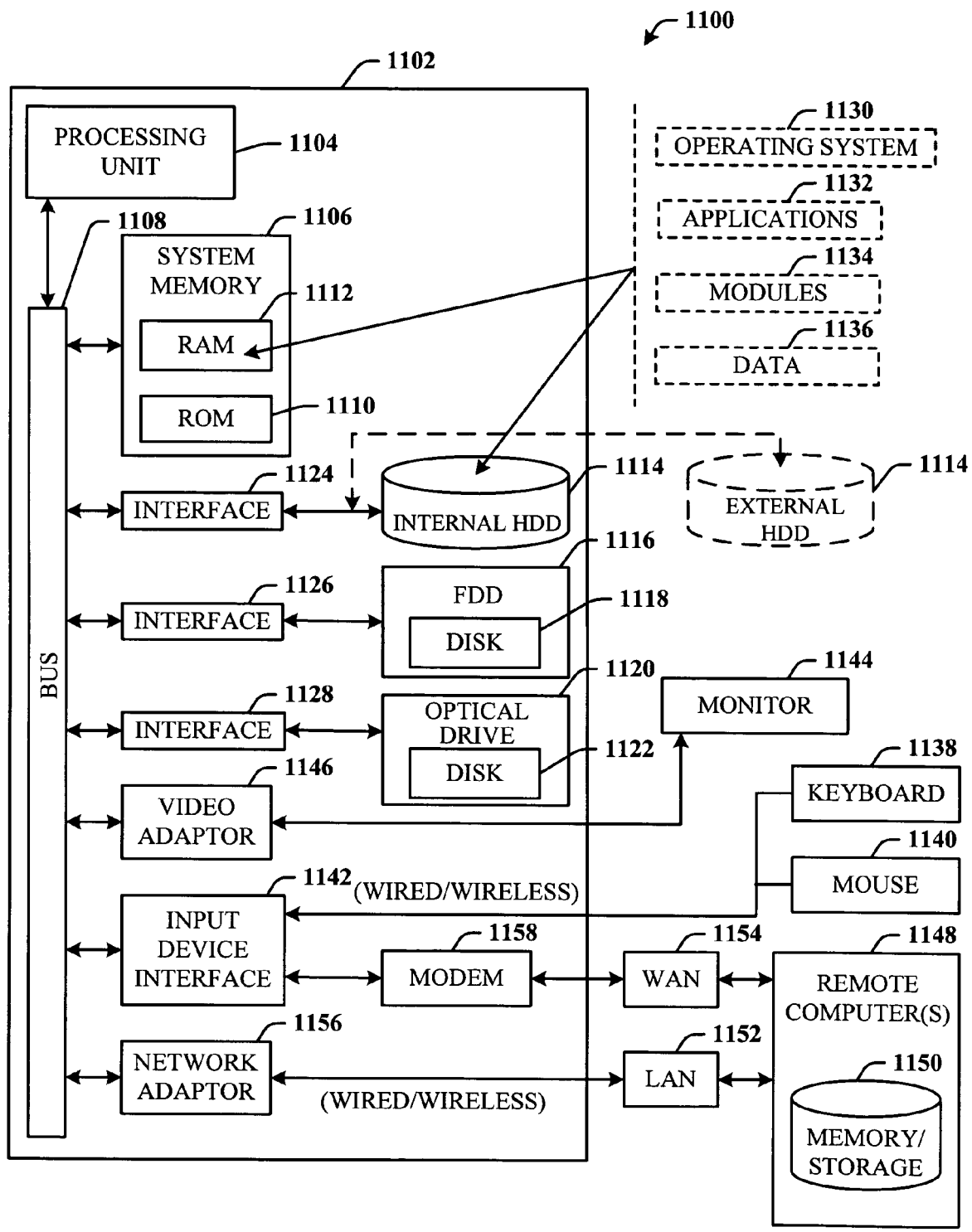
FIG. 11 illustrates a block diagram of a computer operable to execute the disclosed reconciliation architecture.

Referring now to FIG. 11, there is illustrated a block diagram of a computer operable to execute the disclosed architecture. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

Figure 12:
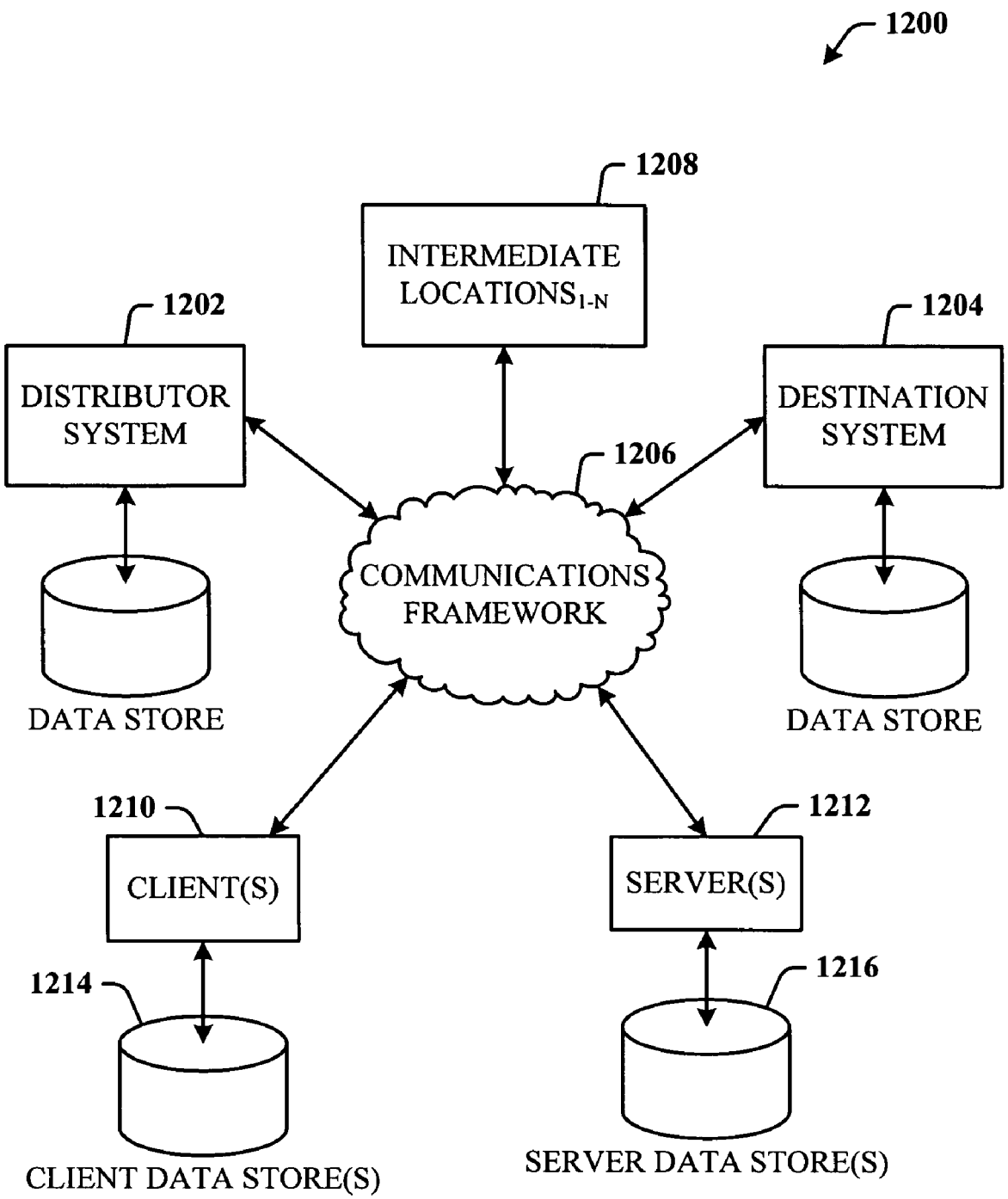
FIG. 12 illustrates a schematic block diagram of an exemplary computing environment in accordance with the subject invention.

FIG. 12 illustrates a schematic block diagram of an exemplary computing environment 1200 in accordance with the subject invention. The system 900 can be employed at either or both of the distributor as a distributor system 1202 or/and the destination (or research facility) as a destination system 1204. A communications framework 1206 (e.g., a global communication network such as the Internet) facilitates inter-communications therebetween and for communications from and to one or more intermediate locations 1208 (denoted INTERMEDIATE LOCATIONS$_{1-N}$) through which the product may travel. Thus, data can be communicated in a wired/wireless fashion to both the distributor system 1202 and the destination system 1204 during transit of the package.

The system 1200 can also include one or more client(s) 1210. The client(s) 1210 can be hardware and/or software (e.g., threads, processes, computing devices). The client(s) 1210 can house cookie(s) and/or associated contextual information by employing the invention, for example.

The system 1200 also includes one or more server(s) 1212. The server(s) 1212 can also be hardware and/or software (e.g., threads, processes, computing devices). The servers 1212 can house threads to perform transformations by employing the invention, for example. One possible communication between a client 1210 and a server 1212 can be in the form of a data packet adapted to be transmitted between two or more computer processes. The data packet may include a cookie and/or associated contextual information, for example.

Communications can be facilitated via a wired (including optical fiber) and/or wireless technology. The client(s) 1210 are operatively connected to one or more client data store(s) 1214 that can be employed to store information local to the client(s) 1210 (e.g., cookie(s) and/or associated contextual information). Similarly, the server(s) 1212 are operatively connected to one or more server data store(s) 1216 that can be employed to store information local to the servers 1212.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An RFID system that processes medical packages, comprising:
    an RFID tag attached to a medical package having contents that include at least one of a drug and a medical-related object; and
    a reconciliation component that reconciles contents of the medical package before and after distribution by examining digital data relating to at least one of the drug and the medical-related object stored in the RFID tag, the RFID tag comprising:
    a controller that receives and processes the digital data received from a sensor;
    a non-volatile memory that stores the digital data and instructions; and
    a communications component that facilitates power to the tag and communications from an RFID reader/writer.

2. The system of claim 1, wherein the digital data is associated with usage information of the drug and the medical-related object.

3. The system of claim 1, further comprising a location component that interfaces to the system such that location information is stored in the memory related to a location that the medical package has been.

4. The system of claim 3, wherein the digital data includes environmental data that is received directly from at least one of the sensor and the converter while at the location.

5. A method of processing a medical product, the method comprising:
    receiving the medical product for processing at a distributor;
    attaching an RFID tag to the medical product;
    writing to the RFID tag medical data associated with the medical product;
    transporting the medical product via multiple locations to a destination;
    storing on the RFID tag location information associated with at least a first location of the multiple locations;
    uploading sensor data to the RFID tag directly from a sensor during transportation of the medical product;
    reading data from the RFID tag at the destination to determine viability of the medical product;
    writing usage data to the RFID tag related to an aspect of the medical product that was changed while at the destination;
    shipping the medical product and attached RFID tag back to the distributor;
    reading the usage data from the RFID tag; and
    reconciling the usage data with a database of preparation medical data associated with the medical product when it was shipped.

6. The method of claim 5, further comprising an act of in-processing the medical product at the distributor after use at the destination such that an act of reading the usage data from the RFID tag during in-processing alleviates exposure to a human of a medical risk associated with the changed aspect of the medical product.

7. The method of claim 5, further comprising an act of writing to the RFID tag and reading from the RFID tag timestamp data and event data associated with an event that occurred during transportation and use of the medical product.

8. The method of claim 5, further comprising an act of selecting between a plurality of protocols for a protocol that facilitates the act of uploading.

9. An RFID system that facilitates processing of a medical product, comprising:
    means for attaching an RFID tag to the medical product;
    means for writing to the RFID tag medical data associated with the medical product when at a distributor;
    means for selecting between a plurality of protocols on the RFID tag for a protocol that facilitates uploading sensor data to the RFID tag directly from a digital interface during transportation of the medical product while in transit from a first location to a second location;
    means for reading data from the RFID tag at the second location to determine viability of the medical product;
    means for writing usage data to the RFID tag related to an aspect of the medical product that was changed while at the second location; and
    means for reconciling the usage data with a database of preparation medical data associated with the medical product when it was shipped.

10. The system of claim 9, further comprising means for in-processing the medical product at the first location after use at the second location such that reading the usage data from the RFID tag during in-processing alleviates exposure to a human of a medical risk associated with the changed aspect of the medical product.

11. The system of claim 9, further comprising means for writing to the RFID tag and reading from the RFID tag timestamp data and event data associated with an event that occurred during transportation and use of the medical product.

12. The system of claim 1, further comprising a location component that interfaces to the system such that location information is written to the memory.

13. The system of claim 12, wherein the location component provides the location information through Global Positioning System (GPS) technology.

14. An article of commerce having attached thereto the system of claim 1.

15. The system of claim 1, further comprising a timing component that facilitates storing timestamp data and event data in the memory.

16. The system of claim 1, wherein the communications component includes an antenna that facilitates writing data and the instructions into the memory, and reading the data out of the memory via RF signals.

17. The system of claim 1, is fabricated into an application-specific integrated circuit (ASIC).

* * * * *

UNITED STATES PATENT AND TRADEMARK OFFICE
CERTIFICATE OF CORRECTION

PATENT NO. : 7,616,117 B2 Page 1 of 1
APPLICATION NO. : 11/184233
DATED : November 10, 2009
INVENTOR(S) : Streeb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1129 days.

Signed and Sealed this

Nineteenth Day of October, 2010

David J. Kappos
*Director of the United States Patent and Trademark Office*